(12) United States Patent
Raslambekov et al.

(10) Patent No.: US 12,636,126 B1
(45) Date of Patent: May 26, 2026

(54) SYSTEMS AND METHODS FOR CONTROLLING A CUTTING HEAD OF A CUTTING DEVICE

(71) Applicant: Oxilio Ltd, Larnaca (CY)

(72) Inventors: Islam Khasanovich Raslambekov, Long Island City, NY (US); Dmitrii Garshin, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

(21) Appl. No.: 19/243,375

(22) Filed: Jun. 19, 2025

(51) Int. Cl.
| | |
|---|---|
| *A61C 7/00* | (2006.01) |
| *A61C 7/02* | (2006.01) |
| *B23K 26/04* | (2014.01) |
| *B23K 26/38* | (2014.01) |

(52) U.S. Cl.
CPC ............... *A61C 7/002* (2013.01); *A61C 7/02* (2013.01); *B23K 26/04* (2013.01); *B23K 26/38* (2013.01)

(58) Field of Classification Search
CPC .... A61C 7/002; A61C 2007/0004; A61C 7/02
See application file for complete search history.

(56) References Cited

U.S. PATENT DOCUMENTS

| | | | |
|---|---|---|---|
| 11,429,080 B2 | 8/2022 | Do et al. | |
| 11,648,087 B2 | 5/2023 | Kopelman | |
| 11,801,120 B2 | 10/2023 | Wilson et al. | |
| 2021/0196430 A1* | 7/2021 | Wilson | A61C 7/002 |
| 2024/0416459 A1 | 12/2024 | Turner et al. | |
| 2025/0009484 A1* | 1/2025 | Hirsch | A61C 13/0018 |

FOREIGN PATENT DOCUMENTS

| | | | |
|---|---|---|---|
| CN | 110693618 | * | 1/2020 |
| CN | 111449773 B | | 8/2021 |
| CN | 110693618 B | | 11/2021 |
| CN | 112959337 B | | 8/2022 |
| CN | 116019577 A | | 4/2023 |
| CN | 118520525 | * | 4/2024 |
| CN | 118141544 A | | 6/2024 |

* cited by examiner

*Primary Examiner* — Jeffrey M Wollschlager
(74) *Attorney, Agent, or Firm* — BCF LLP

(57) ABSTRACT

A method and a system for controlling a cutting head of a cutting device are provided. The method comprises: acquiring a 3D digital model representative of a surface of an unfinished orthodontic appliance, including an indication of the cutline applied thereon; defining, for a given point of the cutline, a plurality of directions for applying the cutting head to the given point; determining, for each direction of the cutting head at the given point, a respective loss value representative of a deviation value of an associated direction from the respective normal at the given point; aggregating, for each direction of the cutting head at each point of the cutline, respective loss values, thereby determining a total loss value; and based on selected directions minimizing the total loss value, determining positions of the cutting head at each point of the cutline for further use in controlling the cutting head.

18 Claims, 10 Drawing Sheets

300

308

10

304          302

SYSTEMS AND METHODS FOR CONTROLLING A CUTTING HEAD OF A CUTTING DEVICE

FIELD

The present technology relates to systems and methods for manufacturing an orthodontic appliance; and more specifically, although not exclusively, to controlling a cutting head of a cutting device for cutting an unfinished orthodontic appliance.

BACKGROUND

In orthodontics, treatments for achieving alignment of malposed teeth in a subject include applying orthodontic appliances, such as orthodontic aligners, to the subject's teeth. Orthodontic aligners are typically worn over teeth of an arch form in order to exert a force to the subject's teeth to cause movements thereof to their respective target positions, typically associated with their alignment within the arch form. In another example, the orthodontic aligners can be used to retain the subject's teeth in an already achieved desired position.

The orthodontic aligners are typically custom-made to the subject's teeth, and a shape of the orthodontic aligners, among other factors, defines the effective forces to be exerted to the teeth, and the effective correction that may be attained. Certain methods of designing such an aligner may comprise obtaining a 3D representation of the arch form, and based thereon, determining the required treatment plan for the teeth requiring alignment. The treatment plan may comprise multiple sequential treatment steps, each treatment step comprising a different aligner to be worn by the subject.

The aligners can be made by a thermoforming process, in which a preform is shaped using a mold to produce an unfinished aligner. The unfinished aligner is further processed, such as by trimming excess material along a predetermined cutline to form an open edge, the idea being that the cutline more closely follows the gum line of the subject for a more comfortable wear. The trimming can be executed by a cutting device, such as a laser cutting device or a cutting mill-based device, along a preliminary determined cutline.

The cutting device usually includes a table for supporting the unfinished aligner and a cutting head configured to move freely around the supported unfinished aligner. The cutting head is configured to follow a preliminary cutting line on the unfinished aligner.

Certain challenges in effectively controlling the cutting head may affect the efficiency of the cutting process and the accuracy of the resulting orthodontic aligner. For example, during the cutting, the cutting head can collide with the table of the cutting device or other portions of the unfinished aligner that are not to be cut. Also, in cases where the cutting device is a laser cutting device, increased time of exposure at a given point along the cutline to the cutting head may result in burns and scorches, affecting the accuracy of the gum line of the orthodontic appliance. This can lead to scratches to the subject's gum, which, in turn, can cause discomfort or even pain, potentially affecting adherence to the orthodontic treatment.

Certain prior art approaches have been proposed to tackle the above-identified technical problem.

Chinese Patent No.: 110,693,618-B, issued on Nov. 16, 2021, assigned to Zhejiang Zhengya Dental Co., Ltd., and entitled "METHOD AND DEVICE FOR DETERMINING CUTTING DIRECTION OF SHELL-SHAPED TOOTH APPLIANCE AND ELECTRONIC EQUIPMENT," discloses a method and a device for determining a cutting direction of a shell-shaped tooth appliance and electronic equipment. The method comprises the following steps: taking a reference cutting direction as a center and a preset offset angle as an offset, and acquiring a plurality of to-be-cut directions in different directions; carrying out interference operation on the direction to be cut of each cutting point and the digital dental model, and screening out a candidate cutting direction corresponding to each cutting point; calculating the coordinates corresponding to the candidate cutting directions according to the energy function, and selecting the cutting direction with the minimum energy function value as the reference cutting direction of the next iteration operation in the calculation result; judging whether the preset offset angle of the next round of iterative operation meets the iterative operation termination condition.

U.S. Pat. No. 11,801,120-B2, issued on Oct. 31, 2023, assigned to Otip Holding LLC, and entitled "SYSTEMS AND METHODS FOR TRIMMING DENTAL ALIGNERS," discloses systems and methods for trimming dental aligners that include a cutline system for identifying a first point and a second point based on a line around tooth (LAT) for a tooth of a model representative of a dentition of a user, where the first point is disposed on a tooth-gingiva interface of the tooth. The cutline system defines a cut plane at a distance from the first point toward the second point, where the cut plane intersects a line between the first point and the second point, identifies a plurality of points on the LAT based on the cut plane, defines a cutline based on the plurality of points on the LAT and the first point, and controls a cutting system to cut the dental aligner along the cutline.

U.S. Pat. No. 11,429,080-B2, issued on Aug. 30, 2022, assigned to Otip Holding LLC, and entitled "SYSTEMS AND METHODS FOR SHEARING ADJUSTMENT OF A DENTAL ALIGNER CUTTING TOOL," discloses a system for adjusting a cutting tool. The system includes a cutting system having a cutting tool configured to cut material thermoformed to a dental model. The cutting system is configured to determine, based on a cutline generated for the cutting tool to cut a dental aligner from the material thermoformed onto the dental model, that the cutting tool is incapable of following the cutline. The cutting system is configured to adjust a position of the cutting tool with respect to the cutline, so the cutting tool is capable of following the cutline.

Chinese Patent Application Publication No.: 116,019,577-A, published on Apr. 28, 2023, assigned to Shanghai Zhengya Dental Technology Co. Ltd., and entitled "METHOD AND DEVICE FOR GENERATING APPLIANCE CUTTING LINE, ELECTRONIC EQUIPMENT AND STORAGE MEDIUM," discloses a method and a device for generating an appliance cutting line. The method comprises: acquiring a digital dental model comprising a digital dental model and a digital gingival model, and establishing a corresponding dental coordinate system; acquiring gum lines of all teeth based on the digital dental model; determining an initialization cutting path according to the digital dental model and a dental coordinate system; performing iterative operation according to a cutting path driving equation, an initialized cutting path and driving stopping conditions to obtain a target cutting path; and uniformly selecting cutting path points on the target cutting path, and determining the cutting direction of the cutting line of the appliance according to the cutting path points and the nearest vertex of each cutting path point, which is away from the digital gum model.

SUMMARY

It is an object of the present technology to ameliorate at least some of the inconveniences present in the prior art.

Developers of the present technology have appreciated that the cutting process of the unfinished aligner can be optimized to increase both the efficiency and accuracy of the resulting orthodontic aligner.

More specifically, to increase the efficiency of the cutting process, the developers have devised methods and systems described herein that are directed to determining the positions for the cutting head by: (i) minimizing the deviation of the cutting head's direction from a respective normal defined at a given point of the cutline; and (ii) minimizing transitions of the cutting head between the points along the cutline. Further, time between the transitions of the cutting head can be determined, and optimal cutting power for cutting through the unfinished aligner can be determined. For example, if the cutting device is a laser cutting device, an optimal level of laser power can be determined for cutting through the unfinished aligner given the determined speed of transitions. This may allow preventing burns and scorches of the orthodontic aligner.

Also, to increase the accuracy of the produced orthodontic aligner, the present methods, in at least some non-limiting embodiments of the present technology thereof, include minimizing the likelihood of collisions between the cutting head and at least one of: (1) a portion of the unfinished aligner that is not to be cut and (2) components of the cutting device, such as the table or other support thereof.

By using the present methods and systems, orthodontic aligners can be manufactured faster, streamlining the entire treatment plan implementation pipeline. Also, the aligners produced in accordance with certain non-limiting embodiments of the present technology can have a more accurate, anatomically shaped, open edge, which may contribute to improved subject adherence to orthodontic treatment.

More specifically, in accordance with a first broad aspect of the present technology, there is provided a computer-implemented method for controlling a cutting head of a cutting device for cutting an unfinished orthodontic appliance along a cutline for producing an orthodontic appliance. The method comprises: acquiring a mold 3D digital model representative of a surface of the unfinished orthodontic appliance, the mold 3D digital model including an indication of the cutline applied thereon; the cutline having a plurality of points defining a path for the cutting head; each point of the plurality of points being associated with a respective normal to the surface of the unfinished orthodontic appliance; defining, for a given point of the plurality of points of the cutline, a plurality of directions for applying the cutting head to the given point; determining, for each direction of the plurality of directions of the cutting head at the given point, a respective loss value representative of a deviation value of an associated direction from the respective normal at the given point; aggregating, for each direction of the cutting head at each point of the plurality of points of the cutline, respective loss values, thereby determining a total loss value; identifying a selected direction of the plurality of directions for the cutting head at the given point that minimizes the total loss value; determining, for each selected direction of the cutting head at a respective point of the cutline, a respective position for the cutting head along the cutline; and storing coordinates of the respective position of the cutting head in association with coordinates of the given point for further use in controlling the cutting head of the cutting device for producing the orthodontic appliance.

In some implementations of the method, the defining the plurality of directions for the cutting head at the given point comprises defining a predetermined number of directions.

In some implementations of the method, defining the plurality of directions for the cutting head at the given point comprises defining the plurality of directions at random.

In some implementations of the method, the defining the plurality of directions for the cutting head at the given point comprises defining the plurality of directions within a given angular range relative to the respective normal at the given point; and prior to the storing, the method further comprises iteratively executing: decreasing the given angular range for the plurality of directions; and executing the steps of (i) the defining the plurality of directions; (ii) the determining the respective loss value; (iii) the determining the respective position; (iv) the determining the total loss value; and (v) the minimizing the total loss value, until the given angular range reaches a predetermined angular threshold.

In some implementations of the method, prior to the determining the respective loss value: the method further comprises determining, for each direction of the plurality of directions, a plurality of constraints, thereby determining a plurality of admissible directions; and the determining the respective loss value comprises determining the respective loss value for each admissible direction of the plurality of admissible directions.

In some implementations of the method, the method further comprises acquiring a device 3D digital model representative of a surface of the cutting device; and the plurality of constraints includes at least one selected from the group consisting of: a reachability constraint for filtering out those of the plurality of directions at the given point, along which positioning the cutting head is infeasible; an acceleration constraint for filtering out, using the mold 3D digital model, those of the plurality of directions at the given point, from which the cutting head will move to respective positions thereof at a sequentially following point of the cutline with an acceleration value outside a predetermined range of acceleration values; a speed constraint for filtering out, using the mold 3D digital model, those of the plurality of directions at the given point, from which the cutting head will move to the respective positions thereof at the sequentially following point of the cutline with a speed value outside a predetermined range of speed values; and a collision constraint for filtering out, using the mold and device 3D digital models, those of the plurality of directions at the given point, at which the cutting head, when positioned at the given point of the cutline, will collide with at least one of: (i) other portions of the cutting device; and (ii) other portions of the unfinished orthodontic appliance aside from the given point.

In some implementations of the method, prior to the determining the total loss value: the method further comprises: determining, for a given direction of the plurality of directions associated with the given point, a plurality of transitions therefrom to each direction associated with a sequentially following point of the cutline; determining, for a given transition of the plurality of transitions: a respective second loss value representative of a path length of the cutting head along the given transition; and a respective third loss value representative of a difference between path lengths along the given transition and along a given preceding transition, from a sequentially preceding point to the given point of the cutline; and the determining the total loss value comprises aggregating, for each direction of the cutting head at each point of the plurality of points of the cutline: (i) the respective loss values; (ii) respective second loss values; and (iii) respective third loss values.

In some implementations of the method, the minimizing the total loss value comprises applying a Dynamic Programming algorithm.

In some implementations of the method, the cutting device is a laser cutting device; and the controlling the cutting head comprises: determining, based on the coordinates of respective position of the cutting head associated with the given point, at least one of a (i) a time and (ii) a speed for performing a given transition from the given point to a sequentially following point of the cutline; based on the at least one of the time and the speed, determining an exposure time for the unfinished orthodontic appliance at the given point of the cutline to laser radiation from the laser cutting device; and feeding, to the laser cutting device: (i) the coordinates of respective positions of the cutting head along the cutline; and (ii) exposure times associated with each point of the cutline, to cause the cutting head to cut the unfinished orthodontic appliance along the cutline.

In accordance with a second broad aspect of the present technology, there is provided a system for controlling a cutting head of a cutting device for cutting an unfinished orthodontic appliance along a cutline for producing an orthodontic appliance. The system comprises at least one processor, a non-transitory computer-readable memory storing executable instructions, which, when executed by the at least one processor, cause the system to: acquire a mold 3D digital model representative of a surface of the unfinished orthodontic appliance, the mold 3D digital model including an indication of the cutline applied thereon; the cutline having a plurality of points defining a path for the cutting head; each point of the plurality of points being associated with a respective normal to the surface of the unfinished orthodontic appliance; define, for a given point of the plurality of points of the cutline, a plurality of directions for applying the cutting head to the given point; determine, for each direction of the plurality of directions of the cutting head at the given point, a respective loss value representative of a deviation value of an associated direction from the respective normal at the given point; aggregate, for each direction of the cutting head at each point of the plurality of points of the cutline, respective loss values, thereby determining a total loss value; identify a selected direction of the plurality of directions for the cutting head at the given point that minimizes the total loss value; determine, for each selected direction of the cutting head at a respective point of the cutline, a respective position for the cutting head along the cutline; and store coordinates of the respective position of the cutting head in association with coordinates of the given point for further use in controlling the cutting head of the cutting device for producing the orthodontic appliance.

In some implementations of the system, to define the plurality of directions for the cutting head at the given point, the executable instructions cause the system to define a predetermined number of directions.

In some implementations of the system, to define the plurality of directions for the cutting head at the given point, the executable instructions cause the system to define the plurality of directions at random.

In some implementations of the system, to define the plurality of directions for the cutting head at the given point, the executable instructions cause the system to define the plurality of directions within a given angular range relative to the respective normal at the given point; and prior to storing, the executable instructions further cause the system to iteratively execute: decreasing the given angular range for the plurality of directions; and (i) defining the plurality of directions; (ii) determining the respective loss value; (iii) determining the respective position; (iv) determining the total loss value; and (v) minimizing the total loss value, until the given angular range reaches a predetermined angular threshold.

In some implementations of the system, prior to determining the respective loss value: the executable instructions cause the system to determine, for each direction of the plurality of directions, a plurality of constraints, thereby determining a plurality of admissible directions; and to determine the respective loss value, the executable instructions cause the system to determine the respective loss value for each admissible direction of the plurality of admissible directions.

In some implementations of the system, the executable instructions further cause the system to acquire a device 3D digital model representative of a surface of the cutting device; and the plurality of constraints includes at least one selected from the group consisting of: a reachability constraint for filtering out those of the plurality of directions at the given point, along which positioning the cutting head is infeasible; an acceleration constraint for filtering out, using the mold 3D digital model, those of the plurality of directions at the given point, from which the cutting head will move to respective positions thereof at a sequentially following point of the cutline with an acceleration value outside a predetermined range of acceleration values; a speed constraint for filtering out, using the mold 3D digital model, those of the plurality of directions at the given point, from which the cutting head will move to the respective positions thereof at the sequentially following point of the cutline with a speed value outside a predetermined range of speed values; and a collision constraint for filtering out, using the mold and device 3D digital models, those of the plurality of directions at the given point, at which the cutting head, when positioned at the given point of the cutline, will collide with at least one of: (i) other portions of the cutting device; and (ii) other portions of the unfinished orthodontic appliance aside from the given point.

In some implementations of the system, prior to determining the total loss value: the executable instructions cause the system to: determine, for a given direction of the plurality of directions associated with the given point, a plurality of transitions therefrom to each direction associated with a sequentially following point of the cutline; determine, for a given transition of the plurality of transitions: a respective second loss value representative of a path length of the cutting head along the given transition; and a respective third loss value representative of a difference between path lengths along the given transition and along a given preceding transition, from a sequentially preceding point to the given point of the cutline; and to determine the total loss value, the executable instructions cause the system to aggregate, for each direction of the cutting head at each point of the plurality of points of the cutline: (i) the respective loss values; (ii) respective second loss values; and (iii) respective third loss values.

In some implementations of the system, to minimize the total loss value comprises, the executable instructions cause the system to apply a Dynamic Programming algorithm.

In some implementations of the system, the cutting device is a laser cutting device; and the controlling the cutting head comprises: determining, based on the coordinates of respective position of the cutting head associated with the given point, at least one of a (i) a time and (ii) a speed for performing a given transition from the given point to a sequentially following point of the cutline; based on the at least one of the time and the speed, determining an exposure time for the unfinished orthodontic appliance at the given point of the cutline to laser radiation from the laser cutting device; and feeding, to the laser cutting device: (i) the coordinates of respective positions of the cutting head along the cutline; and (ii) exposure times associated with each point of the cutline, to cause the cutting head to cut the unfinished orthodontic appliance along the cutline.

In the context of the present specification, the term "orthodontic treatment" is broadly referred to as any type of medical intervention aimed at correcting malocclusions associated with the subject's teeth, including surgical and non-surgical manipulations, such as, but not limited to, using aligners. Further, the orthodontic treatment, as referred to herein, may be determined by a professional practitioner in the field of dentistry (such as an orthodontist, a maxillofacial surgeon, for example), or automatically by a specific software, based on respective image data and input parameters associated with the subject.

In the context of the present specification, the term "cutline" is a representation of an edge of an aligner, at an open end thereof, such as a line along which the edge of the aligner will be formed once an unfinished aligner is cut along the cutline.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
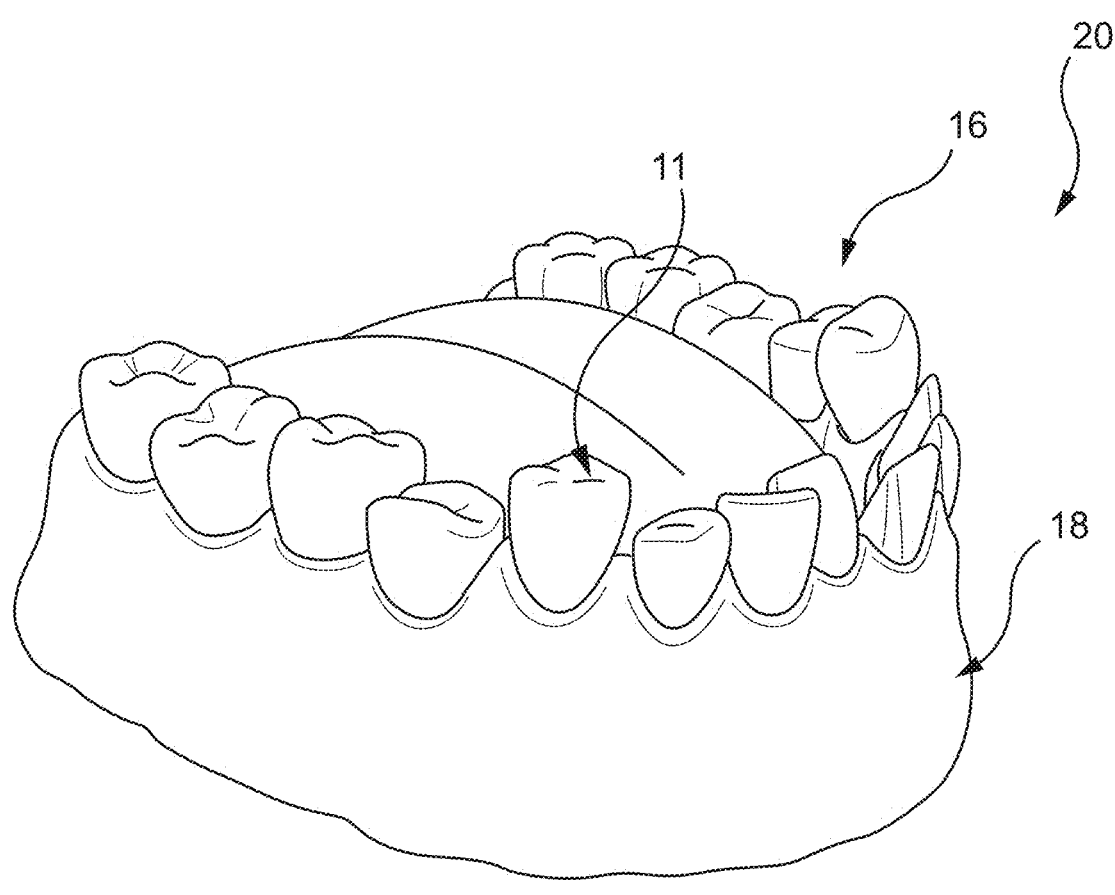
FIG. 1 depicts a perspective view of a lower arch form of a subject providing an example of a misalignment of some
Figure 2A:
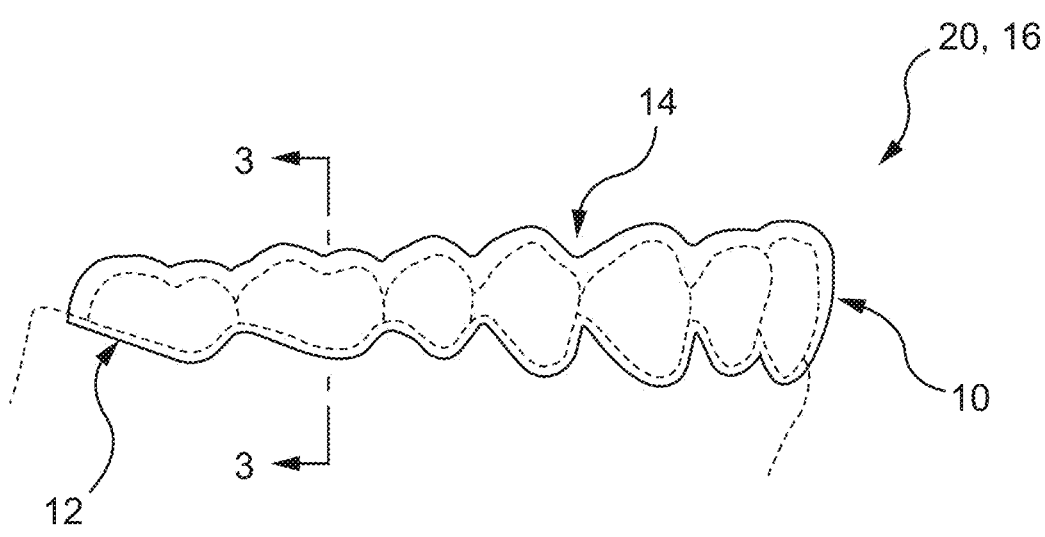
Figure 2B:
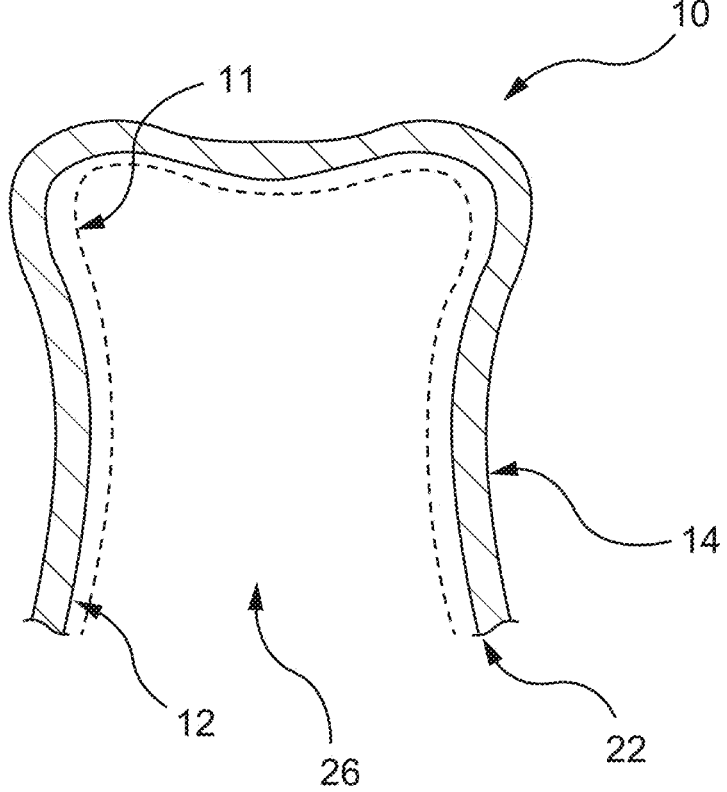
Figure 3:
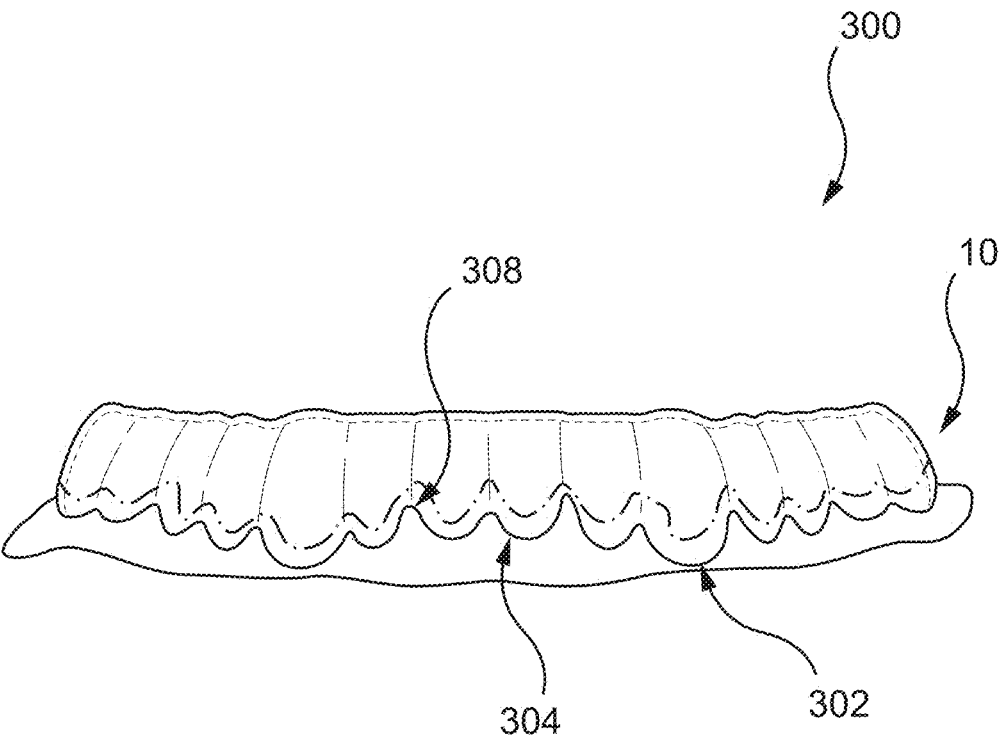
Figure 4:
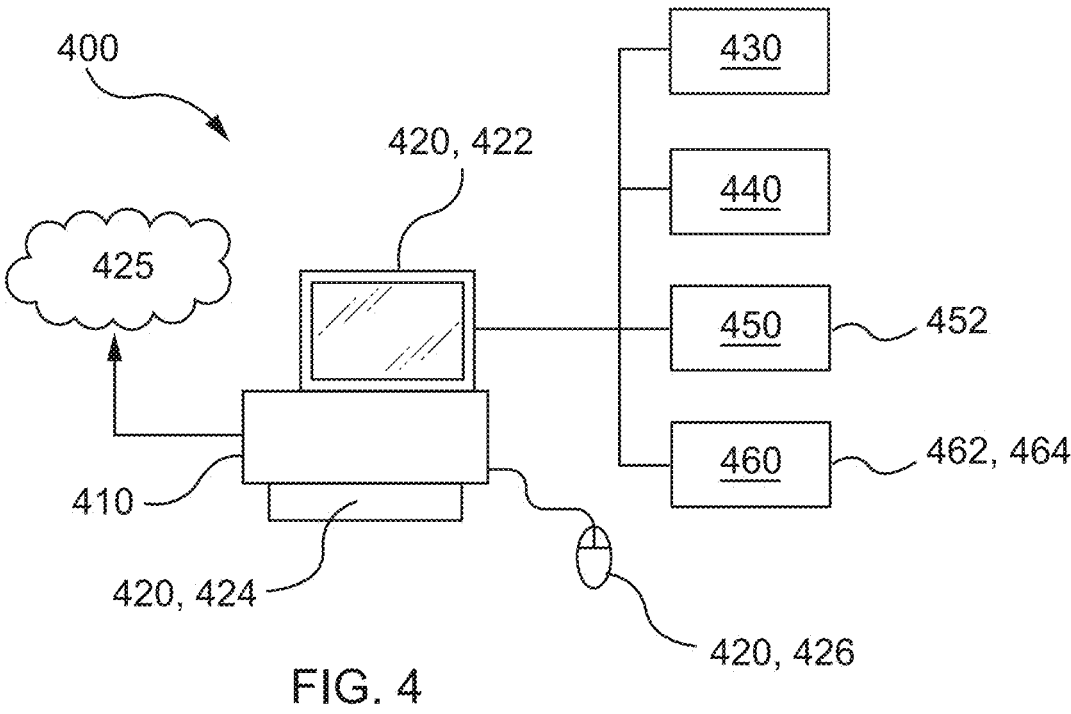
Figure 5:
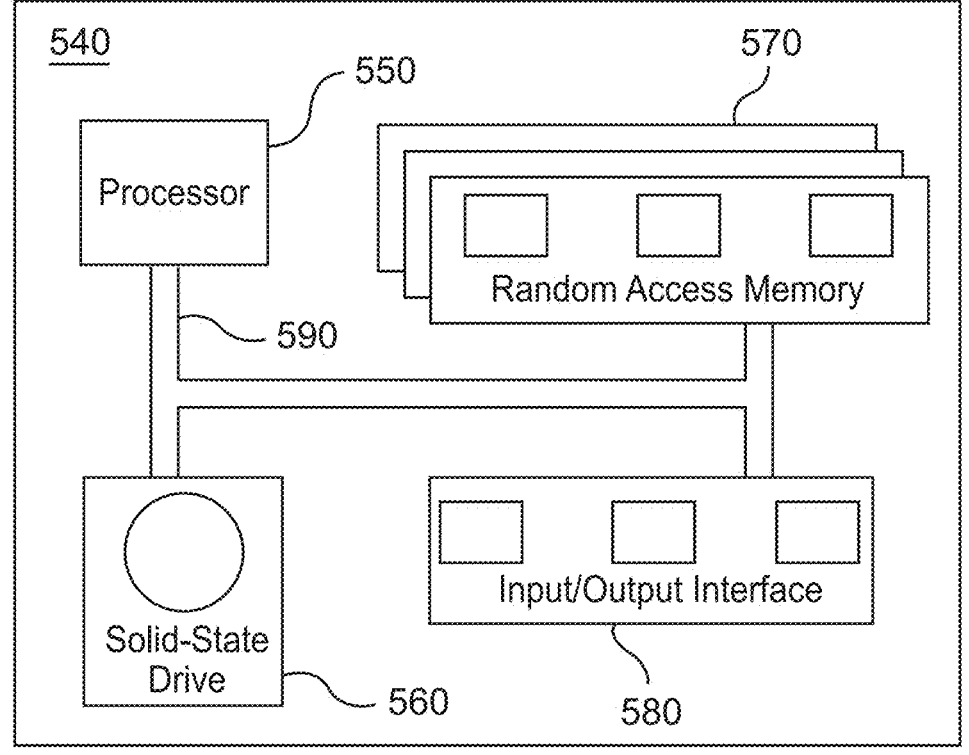
Figure 6:
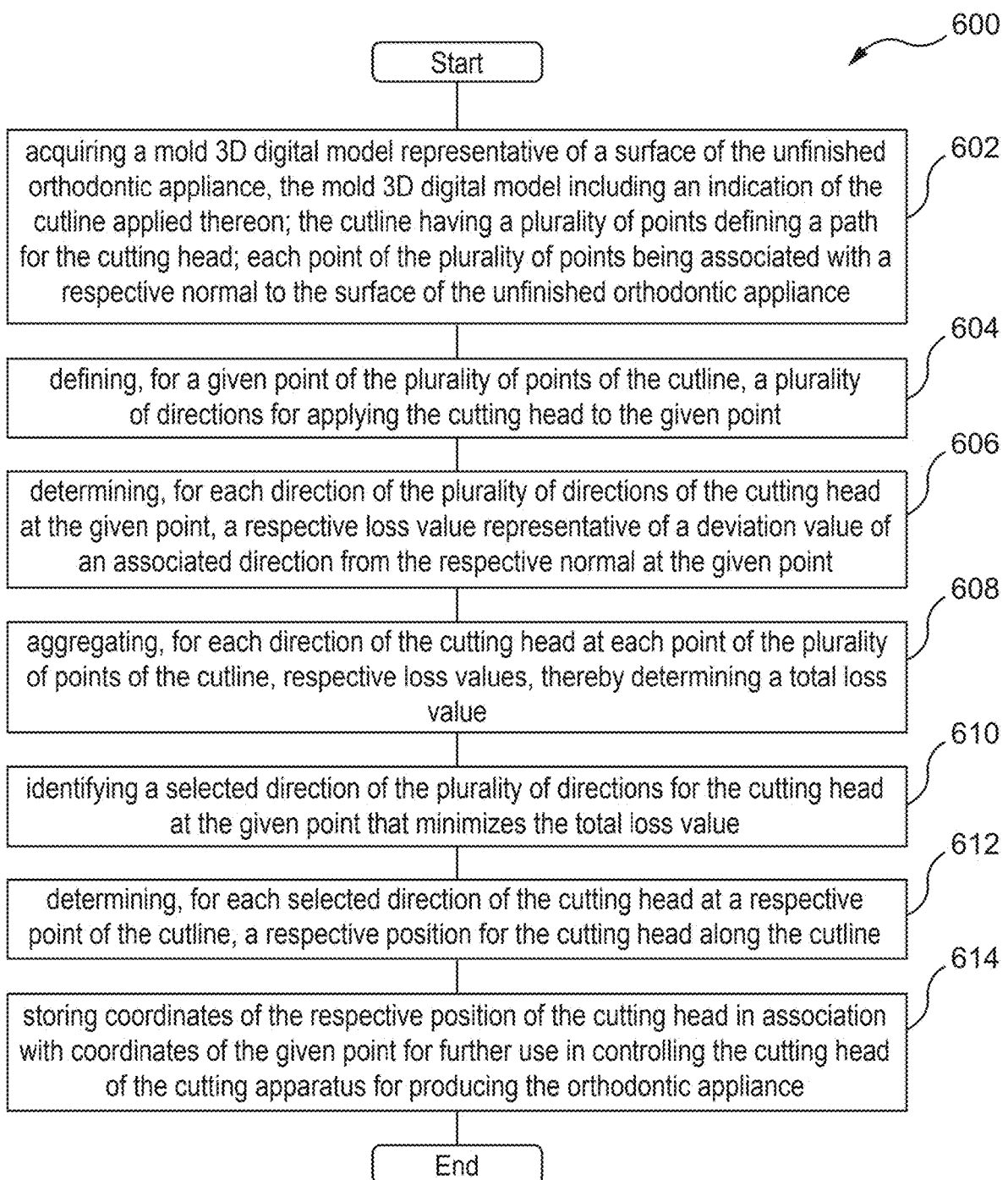
Figure 7:
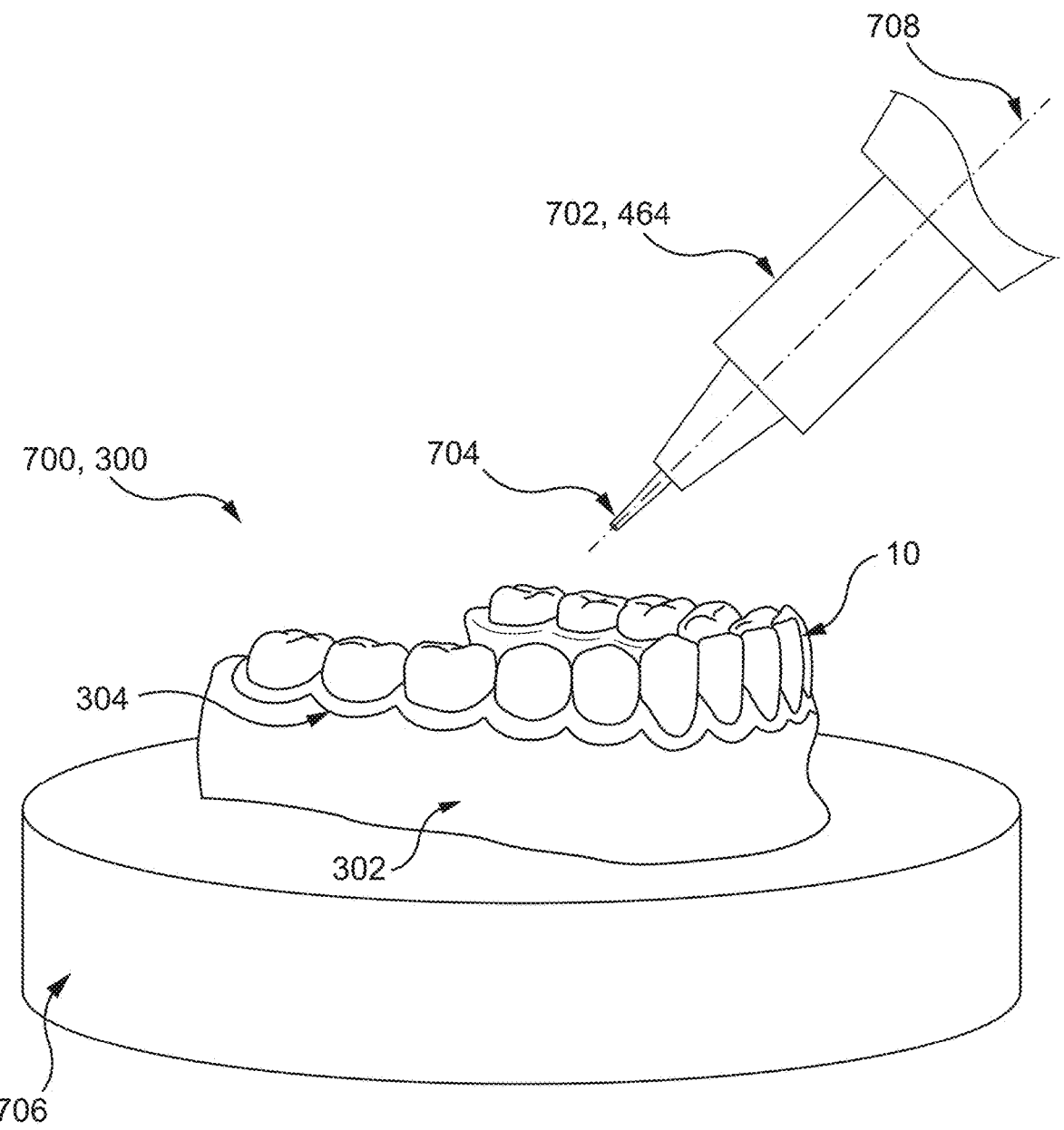
Figure 8:
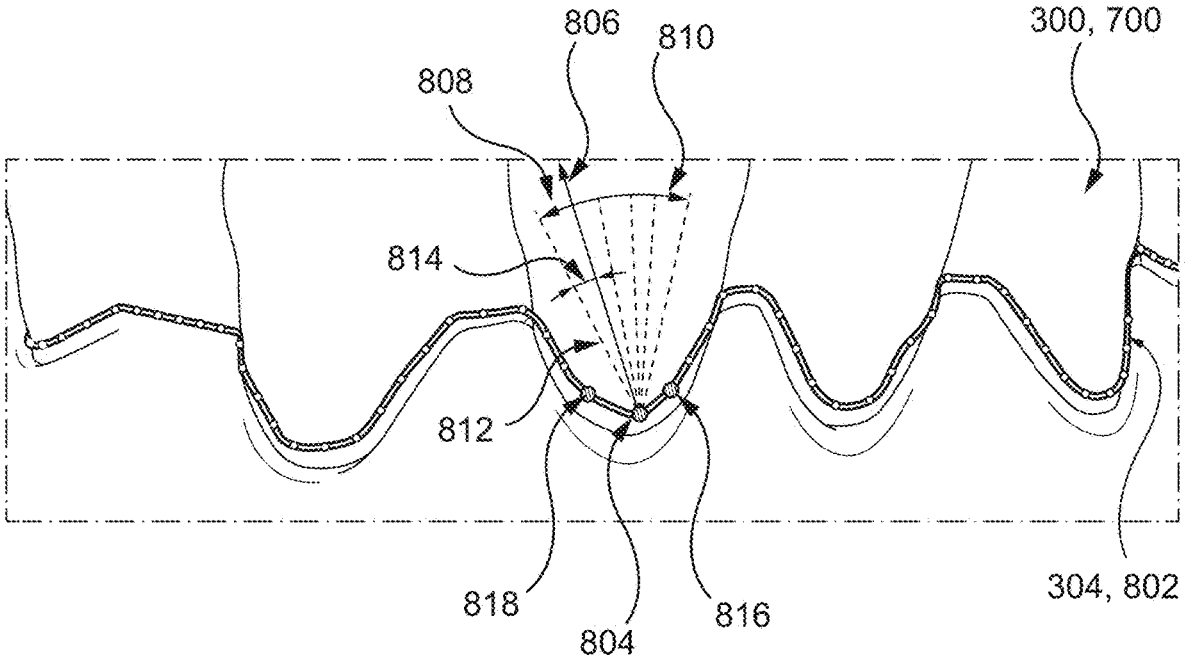
Figure 9A:
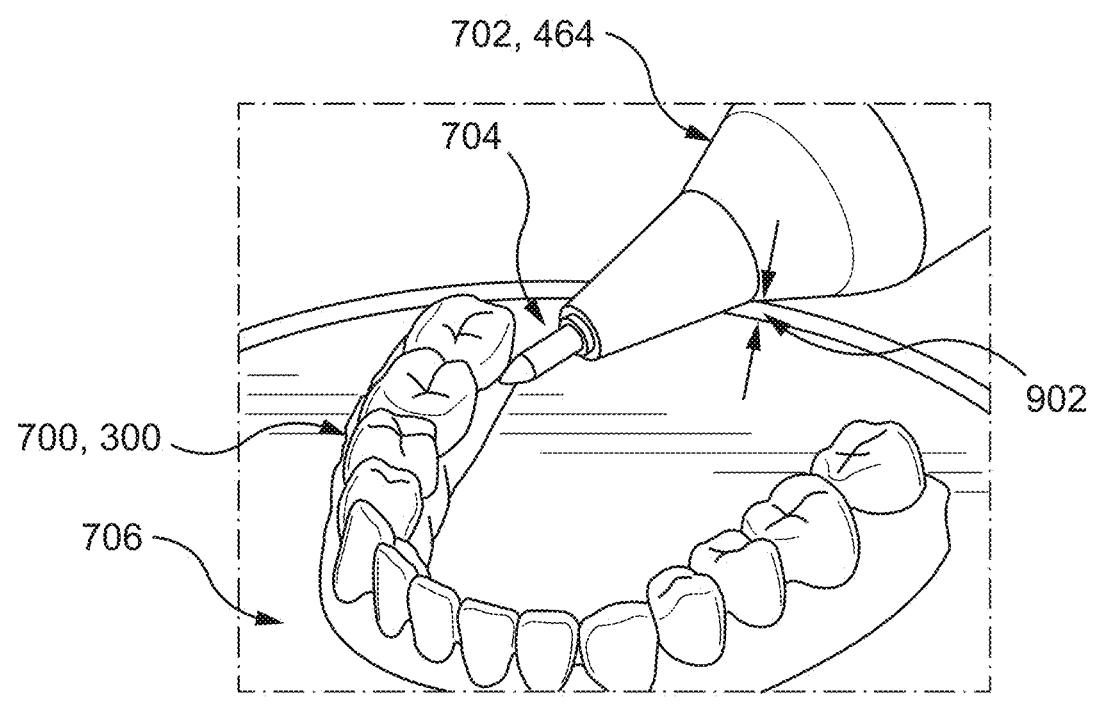
Figure 9B:
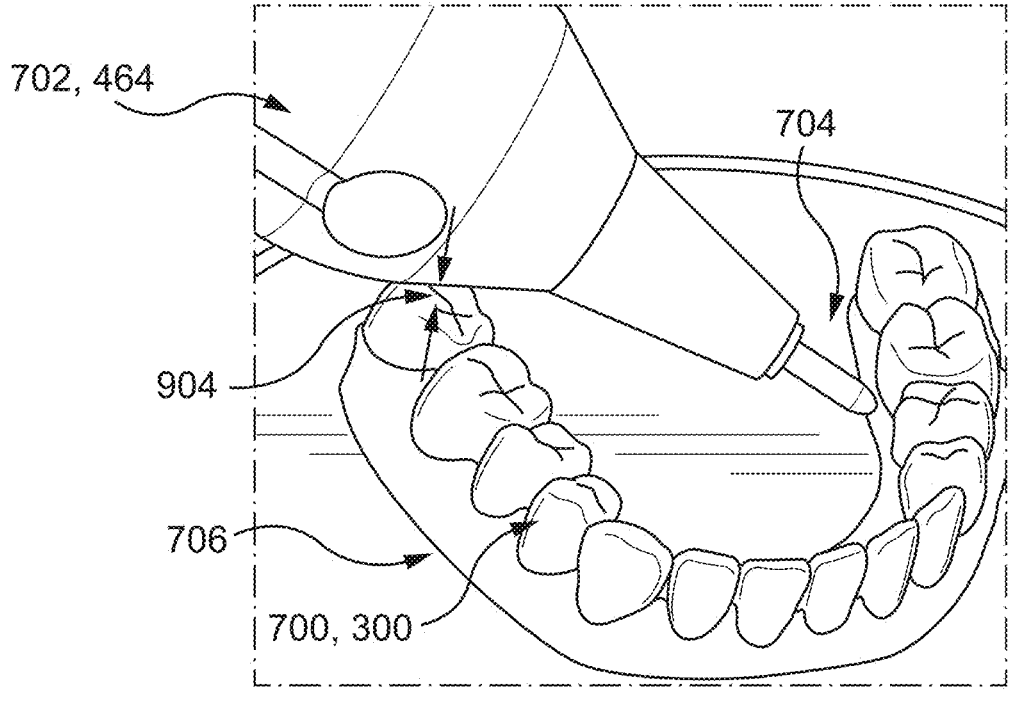
Figure 10:
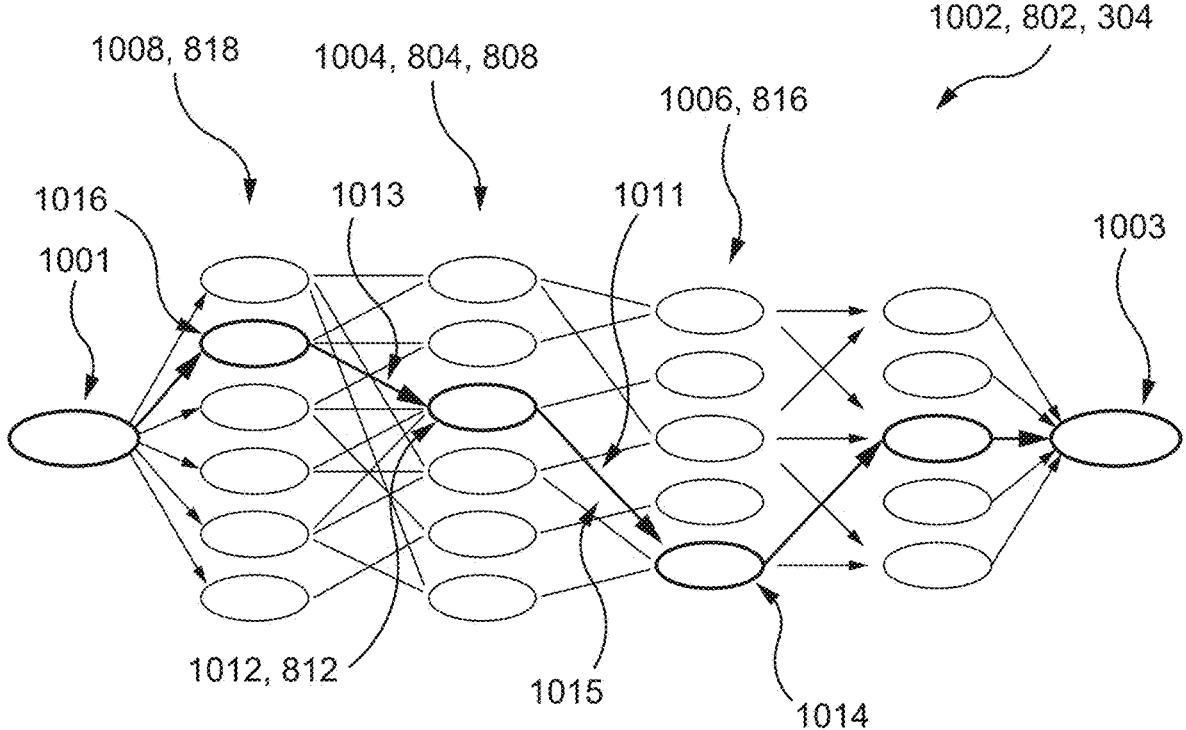
Figure 11:
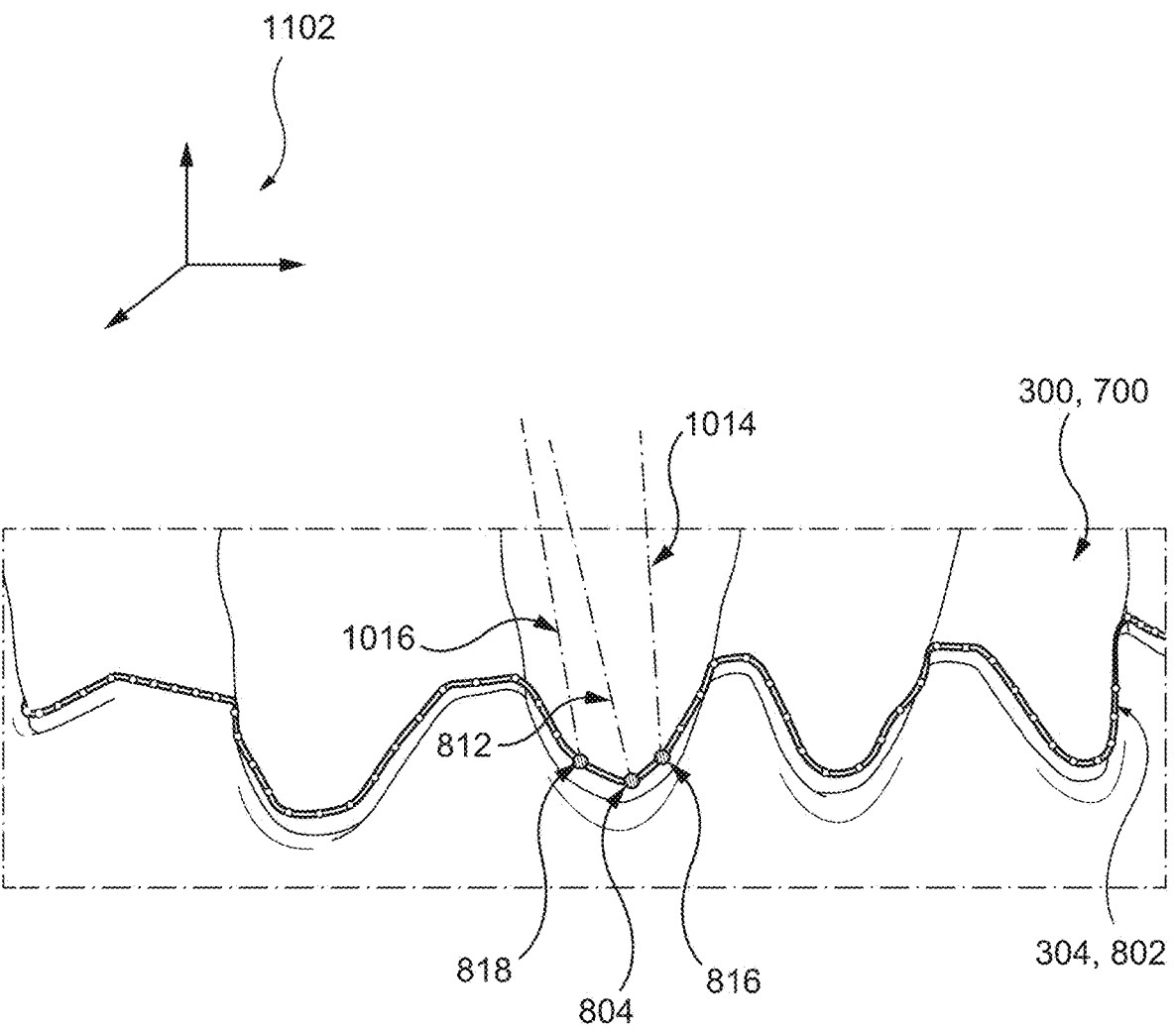

8 of subject's teeth, in accordance with certain non-limiting embodiments of the present technology;

FIGS. 2A and 2B depict a side view and a cross-sectional view through line 3-3, respectively, of a given configuration of an orthodontic appliance applied to the subject's teeth that may be configured to treat the malocclusions of the subject's teeth present in FIG. 1, in accordance with certain non-limiting embodiments of the present technology;

FIG. 3 depicts a panoramic view of an unfinished orthodontic appliance with a cutline applied thereon used for manufacturing the orthodontic appliance present in FIGS. 2A and 2B, in accordance with certain non-limiting embodiments of the present technology;

FIG. 4 depicts a schematic diagram of a system including a cutting device for cutting the unfinished orthodontic appliance of FIG. 3 along the cutline to manufacture the orthodontic appliance of FIGS. 2A and 2B, in accordance with certain embodiments of the present technology;

FIG. 5 depicts a schematic diagram of a computing environment of the system of FIG. 4, in accordance with certain embodiments of the present technology;

FIG. 6 depicts a flowchart diagram of a method of controlling a cutting head of the cutting device present in the system of FIG. 4 for cutting the unfinished orthodontic appliance of FIG. 3 along the cutline to manufacture the orthodontic appliance of FIGS. 2A and 2B, in accordance with certain non-limiting embodiments of the present technology;

FIG. 7 schematically depicts 3D digital models of the unfinished orthodontic appliance of FIG. 3, the cutting device present in the system of FIG. 4, and a table for positioning the unfinished orthodontic appliance for cutting, in accordance with certain non-limiting embodiments of the present technology;

FIG. 8 depicts a magnified view of the 3D digital model of the unfinished orthodontic appliance of FIG. 7 with the cutline applied thereon including a plurality of points to which the cutting head of the cutting device present in the system of FIG. 4 is to be applied, in accordance with certain non-limiting embodiments of the present technology;

FIGS. 9A and 9B schematically depict possible collisions between the cutting device present in the system of FIG. 4 and the unfinished orthodontic appliance of FIG. 3 that can be avoided by using at least some non-limiting embodiments of the present technology;

FIG. 10 depicts a schematic diagram of a graph structure used by a processor of the computing environment of FIG. 5 for identifying directions and transitions for the cutting head of the cutting device present in the system of FIG. 4 for cutting the unfinished orthodontic appliance of FIG. 3 for producing the orthodontic appliance of FIGS. 2A and 2B, in accordance with certain non-limiting embodiments of the present technology; and FIG. 11 depicts the magnified view of the 3D digital model of FIG. 8 with selected directions for applying the cutting head of the cutting device present in the system of FIG. 4 at each point of the cutline, determined in accordance with the method of FIG. 6, in accordance with certain non-limiting embodiments of the present technology.

It should be noted that, unless otherwise explicitly specified herein, the drawings are not to scale.

DETAILED DESCRIPTION

Certain aspects and embodiments of the present technology are directed to methods of and systems for controlling a cutting head of a cutting device for producing an orthodontic aligner.

More specifically, certain aspects and embodiments of the present technology comprise a computer-implemented method of (i) determining positions and transitions for the cutting head to move along a cutline that has been preliminarily determined and applied to an unfinished orthodontic aligner; and (ii) based on the so determined positions and transitions of the cutting head, causing the cutting device to move the cutting head along the cutline of the unfinished orthodontic aligner, thereby producing the orthodontic aligner.

Certain embodiments of the present technology minimize, reduce, or avoid some of the problems noted with the prior art. For example, by implementing certain embodiments of the current technology in respect of determining the cutline, one or more of the following advantages may be obtained: (1) a shape of the aligner having an improved wear comfort due to preventing risks of cutting errors and preventing burns and scorches along the resulting open edge of the orthodontic aligner, which may further allow for an increased adherence of the subject to the orthodontic treatment and hence effectiveness thereof; and (2) a greater efficiency of manufacturing the aligners due to using minimizing deviations of the cutting head's directions from respective normal defined at each point of the cutline and minimizing transitions between the positions of the cutting head at sequentially following points of the cutline.

Orthodontic Treatment

With initial reference to FIG. 1, there is depicted a perspective view of a lower arch form 20 of the subject, to which certain aspects and non-limiting embodiments of the present technology may be applied.

As can be appreciated, the lower arch form 20 includes lower teeth 16 and lower gingiva 18. Further, in the depicted embodiments of FIG. 1, a given tooth 11 is misaligned within the lower arch form 20. More specifically, the given tooth 11 abnormally protrudes upwardly and is shifted lingually.

Thus, for resolving the present orthodontic disorders of the lower teeth 16, an orthodontic treatment may be provided to the subject.

In accordance with certain non-limiting embodiments of the present technology, the orthodontic treatment may comprise applying an orthodontic appliance. Generally speaking, the orthodontic appliance may be configured to exert a respective predetermined force onto the given tooth 11 causing it to move towards a desired position, which may be associated with an alignment of the given tooth 11 within the lower teeth 16. More specifically, in the depicted embodiments of FIG. 1, the orthodontic appliance may be configured to cause the given tooth 11 to move outwardly, that is, labially, between its neighboring teeth; and further cause intrusion of the given tooth 11 in tissues of the lower gingiva 18. In various non-limiting embodiments of the present technology, the orthodontic appliance may comprise orthodontic appliances of different types, shapes, sizes and configurations, such as those including, without limitation, splints, brackets, multi-strand wires, strips, retainers, and plates.

In specific non-limiting embodiments of the present the present technology, the orthodontic appliance may include an orthodontic aligner. With reference to FIGS. 2A and 2B, there is depicted an aligner 10 applied to at least some of the lower teeth 16, in accordance with certain non-limiting embodiments of the present technology. The aligner 10 comprises an inner surface 12 and an outer surface 14. The inner surface 12 defines a channel 26, which is configured, in some non-limiting embodiments of the present technology, for receiving crown portions of the at least some of the lower teeth 16 including the given tooth 11. However, in other non-limiting embodiments of the present technology, the channel 26 of the aligner 10 may be configured to receive crown portions of all of the lower teeth 16. At least one edge, such as an open edge 22 of the channel 26, extending along labial and lingual surfaces of the lower teeth 16, can be shaped for following the lower gingiva 18.

It is appreciated that, in accordance with certain non-limiting embodiments of the present technology, the aligner 10 may be used for treating different types of teeth misalignment or malocclusion, including but not limited to one or more of: closing interdental spaces ("space closure"), creating/widening interdental spaces, tooth rotation, tooth intrusion/extrusion, and tooth translation, to name a few. It should further be noted that in certain non-limiting embodiments of the present technology, applying the aligner 10 to the lower teeth 16 may further include applying specific attachments (also known as "fixing blocks") thereto.

The aligner 10 is designed in such a way that the inner surface 12 thereof is configured to impose certain forces on one or more of the lower teeth 16 to obtain a desired position of the lower teeth 16 at a given stage of the orthodontic treatment.

Needless to say, although in the depicted embodiments of FIGS. 2A and 2B, the aligner 10 is configured to be applied onto the lower teeth 16, in other non-limiting embodiments of the present technology, a respective configuration of the aligner 10 may be applied to the upper teeth (not depicted) of the subject for conducting the orthodontic treatment of respective malocclusion disorders.

According to certain non-limiting embodiments of the present technology, the aligner 10 may be made of a polymer, such as a thermoplastic material. In other non-limiting embodiments of the present technology, the aligner 10 may be made of poly-vinyl chloride (PVC). In yet other non-limiting embodiments of the present technology, the aligner 10 may be made of polyethylene terephthalate glycol (PETG). Other suitable materials can also be used to form the aligner 10.

In some non-limiting embodiments of the present technology, the aligner 10 may be manufactured using additive manufacturing techniques, such as 3D printing techniques where the aligner 10, including the desired configuration of the open edge 22 is formed through printing according to a pre-generated 3D representation thereof.

However, in other non-limiting embodiments of the present technology, the aligner 10 may be produced by a thermoforming process where (1) an unfinished aligner is produced, using a preform, on a respective aligner mold associated with a respective stage of the orthodontic treatment, which is configured to shape the inner surface 12 of the aligner 10; and (2) the unfinished aligner is cut along a predetermined cutline, defining the open edge 22 of the channel 26 of the aligner 10, to remove excess material therefrom, thereby producing the aligner 10.

With reference to FIG. 3, there is depicted an example configuration of an unfinished aligner 300 used for producing the aligner 10, in accordance with certain non-limiting embodiments of the present technology.

As it can be appreciated from FIG. 3, the unfinished aligner 300 includes an excess portion 302 formed as an artefact after the thermoforming, which thus needs to be removed in order to produce the aligner 10, which comprises an upper portion (in the orientation of FIG. 3) of the unfinished aligner 300. For example, according to certain non-limiting embodiments of the present technology, the unfinished aligner 300 may be trimmed by a cutting device (such as a cutting device 464 described below with reference to FIG. 4) along a cutline 304. As will be described in detail below, the cutting device 464 can be configured to cut the unfinished aligner 300 along the cutline 304 by applying thereto a cutting head, which is schematically depicted in FIG. 7 at numeral 704.

It is not limited how the cutline 304 is determined. For example, in some non-limiting embodiments of the present technology, the cutline 304 can be determined in accordance with methods described in a co-owned U.S. Pat. No. 11,723, 750-B1, issued on Aug. 15, 2023, and entitled "SYSTEMS AND METHODS FOR DETERMINING AN EDGE OF ORTHODONTIC APPLIANCES," the content of which is incorporated by reference in its entirety.

More specifically, in order to determine the cutline 304 a processor executing the present method (such as a processor 550 described below with reference to FIG. 5) can be configured to: (i) acquire (1) a current 3D digital model representative of a current configuration of a surface of a subject's arch form, such as the lower arch form 20, including the lower teeth 16 and the lower gingiva 18; and (2) data representative of segmentation contours between the lower teeth 16 and the lower gingiva 18; (ii) obtain, in the current 3D digital model, along a surface of the lower gingiva 18, an indication of a respective position for a given control point of a plurality of control points, the plurality of control points defining the open edge for the aligner 10, the respective position for the given control point being determined such that: the respective position corresponds to a position on the lower gingiva 18 undergoing a predetermined change of a profile of the lower gingiva 18 during the orthodontic treatment, and the respective position corresponds to a position on the lower gingiva 18 which is within a predetermined distance from a given segmentation contour associated with a respective tooth; (iii) determine, based on the obtained respective positions of each one of the plurality of control points within the current 3D digital model, a respective vector of positioning values for each one of the plurality of control points. To determine the respective vector of positioning values for the given control point of the plurality of control points, the processor 550 can be configured for: (1) identifying, along the given segmentation contour, at least one anchor point of a plurality of anchor points; identifying, in the plurality of anchor points, a closest anchor point to the given control point; determining a distance from the given control point to the closest anchor point. Finally, the processor 550 can be configured to (iv) store the respective vector of positioning values for each control point of the plurality of control points for further use in determining a respective configuration of the open edge 22 for the aligner 10.

In other non-limiting embodiments of the present technology, to determine the cutline 304 for the aligner 10, the processor 550 can be configured to apply one of the methods described in a co-owned U.S. Pat. No. 11,058,515-B1, issued on Jul. 13, 2021, and entitled "SYSTEMS AND METHODS FOR FORMING DENTAL APPLIANCES," the content of which is incorporated by reference in its entirety. More specifically, according to at least some embodiments of these methods, the processor 550 can be configured to: (i) obtain the current 3D digital model of the lower arch form 20; (ii) obtain, using the current 3D digital model, for each one of the lower teeth 16, a respective one of a plurality of individual segmentation loops, a given one of the plurality of individual segmentation loops being indicative of a boundary between the given tooth 11 and the lower gingiva 18; (iii) segment each one of the plurality of individual segmentation loops into a buccal portion and a lingual portion; (iv) sequentially join respective buccal portions and respective lingual portions associated with each one of the plurality of individual segmentation loops, thereby generating a single arch form loop; (v) smooth, the single arch form loop, thereby generating a smoothed single arch form loop; and (vi) determining the cutline 304 for the aligner 10 as the smoothed single arch form loop.

However, some challenges associated with manufacturing the aligner 10 from the unfinished aligner 300 can include challenges to effectively control the cutting head 704 of the cutting device 464. For example, as will become apparent from the description provided herein below, if a direction of applying the cutting head 704 to a given point of the cutline 304 is deviated from an associated normal defined at the given point, the resulting cut may be inconsistent. More specifically, in cases where the thickness of the unfinished aligner 300 at the given point along the direction deviated from the associated normal is greater than along the associated normal, the cutting head 704 may not entirely cut through the unfinished aligner 300, which would result in an undercut. By contrast, if the thickness of the unfinished aligner 300 at the given point along the direction deviated from the associated normal is less than along the associated normal, the cutting head 704 may penetrate too deeply into the unfinished aligner 300. This may result in damaging portions of the aligner 10 that are not to be cut, or, in cases where the cutting device 464 is a laser cutting device, in scorches and burns along the open edge 22 of the aligner 10. Such damage to the open edge 22 may result in aggravation (such as rubbing and scratching) to the lower gum 18 of the subject during the implementation of the orthodontic treatment.

Another technical challenge associated with the controlling the cutting head 704 is associated with transitioning thereof from the given point to a sequentially following point along the cutline 304. More specifically, to perform a given transition between a pair of sequentially following points along the cutline 304, the cutting head 704 may move along a path extending through a portion of the cutting device or a portion of the unfinished aligner 300 that is not intended to be cut, thereby causing the associated damages. In another example, the given transition can be executed with an acceleration or speed outside respective predetermined ranges, which may cause under- or overcuts mentioned above. In yet another example, the given transition can be defined along a non-optimal path rather than a minimal one, reducing the overall efficiency of the cutting process.

Thus, the developers of the present technology have devised methods and systems described herein that may address the above-identified technical problems. More specifically, as will be described in greater detail below, the developers have appreciated that the deviation of the cutting head 704 from the associated normals at respective points defining the cutline 304 as well as transitions of the cutting head 704 between sequentially following points can be optimized by using specific loss values. These loss values, which are representative, inter alia, of the deviations of the direction of the cutting head 704 at the given point from the associated normal and/or a current path length of the transition of the cutting head 704 between the points of the cutline 304, can further be iteratively minimized.

Also, the developers have appreciated that risks of collisions between the cutting head 704 and the portions of the cutting device 464 and/or portions of the unfinished aligner

300 that are not intended to be cut as well as unfeasible movements of the cutting head 704 during the cutting process can be minimized by preliminary modelling of the movement of the cutting head 704 thus applying certain constraints for prohibiting undesired transitions of the cutting head 704 between the points of the cutline 304.

Thus, the present methods may enable the determination of optimal positions of the cutting head 704 at each point along the cutline 304, as well as smoother, faster, and collision-free transitions of the cutting head 704 along the cutline 304. As a result, the cutting process can be performed more efficiently, allowing for a more accurate fabrication of the open edge 22 of the aligner 10, as modeled. This, in turn, may help improve subject adherence to orthodontic treatment.

How the loss values are determined and optimized, as well as how the above-mentioned constraints on the movement of the cutting head 704 are applied, in accordance with certain non-limiting embodiments of the present technology, will be described below with reference to FIGS. 6 to 11.
System With reference to FIGS. 4 and 5, there is depicted a schematic diagram of a system 400 suitable for controlling the cutting head 704 of the cutting device 464 for cutting the unfinished aligner 300 for producing the open edge 22 of the aligner 10 as described above, in accordance with certain non-limiting embodiments of the present technology.

It is to be expressly understood that the system 400 as depicted is merely an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the system 400 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 400 may provide in certain instances simple implementations of the present technology, and that where such is the case they have been presented in this manner as an aid to understanding. As persons skilled in the art would further understand, various implementations of the present technology may be of a greater complexity.

In certain non-limiting embodiments of the present technology, the system 400 of FIG. 4 comprises a computer system 410. The computer system 410 may be configured, by pre-stored program instructions, to control, based on image data associated with the subject and the cutting device 464, the cutting head 704 thereof to form a shape of the open edge 22 for the aligner 10. By doing so, the computer system 410 can be configured to produce the aligner 10 for further use in orthodontic treatment of the subject, as mentioned above.

To that end, in some non-limiting embodiments of the present technology, the computer system 410 may be configured to receive image data pertaining to the subject or to a given stage of the orthodontic treatment. According to some non-limiting embodiments of the present technology, the computer system 410 may receive the image data via local input/output interface (such as USB, as an example, not separately depicted). In other non-limiting embodiments of the present technology, the computer system 410 may be configured to receive the image data over a communication network 425, to which the computer system 410 is communicatively coupled.

In some non-limiting embodiments of the present technology, the communication network 425 is the Internet and/or an Intranet. Multiple embodiments of the communication network may be envisioned and will become apparent to the person skilled in the art of the present technology. Further, how a communication link between the computer system 410 and the communication network 425 is implemented will depend, inter alia, on how the computer system 410 is implemented, and may include, but is not limited to, a wire-based communication link and a wireless communication link (such as a Wi-Fi communication network link, a 3G/4G communication network link, and the like).

It should be noted that the computer system 410 can be configured for receiving the image data from a vast range of devices. Some of such devices can be used for capturing and/or processing data pertaining to maxillofacial and/or cranial anatomy of the subject. In certain embodiments, the image data received from such devices is indicative of properties of anatomical structures of the subject, including: teeth, intraoral mucosa, maxilla, mandible, temporomandibular joint, and nerve pathways, among other structures. In some non-limiting embodiments of the present technology, at least some of the image data is indicative of properties of external portions of the anatomical structures, for example dimensions of the given gingival sulcus 308, and dimensions of an external portion of the given tooth 11 of the lower teeth 16, such as a crown portion (not separately labelled) thereof extending outwardly of the gingival sulcus 308. In some embodiments, the image data is indicative of properties of internal portions of the anatomical structures, for example, volumetric properties of bone surrounding an internal portion of the given tooth 11 extending inwardly of the given gingival sulcus 308, such as a root portion (not separately depicted) of the given tooth 11. Under certain circumstances, such volumetric properties may be indicative of periodontal anomalies which may be factored into an orthodontic treatment plan. In some non-limiting embodiments of the present technology, the image data includes cephalometric image datasets. In some embodiments, the image data includes datasets generally intended for the practice of endodontics. In some embodiments, the image data includes datasets generally intended for the practice of periodontics.

In alternative non-limiting embodiments of the present technology, the computer system 410 may be configured to receive the image data associated with the subject directly from an imaging device 430 communicatively coupled thereto. Broadly speaking, the processor 550 may be configured to cause the imaging device 430 to capture and/or process the image data of the lower teeth 16 and the periodontium (not depicted) of the subject. In certain non-limiting embodiments of the present technology, the image data may include, for example, one or more of: (1) images of external surfaces of respective crown portions of the lower teeth 16, (2) images of an external surface of the periodontium including that of the lower gingiva 18, for example, and images of superficial blood vessels and nerve pathways associated with the lower teeth 16; and (3) images of an oral region. By doing so, the imaging device 430 may be configured, for example, to capture image data of the lower arch form 20 of the subject. In another example, the imaging device may also be configured to capture and/or process image data of an upper arch form (not depicted) associated with the subject without departing from the scope of the present technology. It should be noted that the image data may include two-dimensional (2D) data and/or three-dimensional data (3D). Further, in certain non-limiting embodiments of the present technology, the image data includes 2D data, from which 3D data may be derived, and vice versa.

In some non-limiting embodiments of the present technology, similarly, the computer system 410 can be configured to acquire the image data associated with the cutting device 464. For example, the processor 550 of the computer system 410 can be configured to cause the imaging device 430 to capture and/or process the image data representative of a surface of the cutting device 464 and components thereof, such as the cutting head 704, described in greater detail below. In other non-limiting embodiments of the present technology, the computer system 410 can be configured to acquire a pre-generated 3D digital model of the cutting device 464

In some non-limiting embodiments of the present technology, the imaging device 430 may comprise an intra-oral scanner enabling to capture direct optical impressions of the lower arch form 20 the subject. In a specific non-limiting example, the intraoral scanner can be of one of the types available from MEDIT, CORP. of 23 Goryeodae-ro 22-gil, Seongbuk-gu, Seoul, South Korea. It should be expressly understood that the intraoral scanner can be implemented in any other suitable equipment.

In yet other non-limiting embodiments of the present technology, the imaging device 430 can comprise a 3D laser scanner enabling to obtain a respective point cloud 3D digital model of the lower arch form 20—such as by scanning the lower arch form 20 directly or a mold thereof and thus registering three-dimensional coordinates of points representative of the surface of the lower arch form 20. In a specific non-limiting example, the 3D laser scanner can be of one of the types available from LASER DESIGN LTD. of 5900 Golden Hills Drive, Minneapolis, MN 55416. It should be expressly understood that the desktop scanner can be implemented in any other suitable equipment.

Further, it is contemplated that the computer system 410 may be configured for processing of the received image data. The resulting image data of the lower arch form 20 and the cutting device 464 received by the computer system 410 is typically structured as a binary file or an ASCII file, may be discretized in various ways (e.g., point clouds, polygonal meshes, pixels, voxels, implicitly defined geometric shapes), and may be formatted in a vast range of file formats (e.g., STL, OBJ, PLY, DICOM, and various software-specific, proprietary formats). Any image data file format is included within the scope of the present technology. For implementing functions described above, the computer system 410 may further comprise a corresponding computing environment.

Further, in some non-limiting embodiments of the present technology, the system 400 may be configured, based on the 3D digital model of the lower arch form 20, for example, determine the orthodontic treatment for the subject including (i) determining tooth trajectories for the at least some of the lower teeth 16, such as the given tooth 11, defining their paths from their initial to target positions; and (ii) respective forces to be applied to the at least some of the lower teeth 16 causing them to move along the so determined tooth trajectories.

For example, in some non-limiting embodiments of the present technology, the processor 550 can be configured to determine the tooth trajectories and the respective forces causing the lower teeth 16 to move along the tooth trajectories as described in a co-owned U.S. Pat. No. 10,993,782-B1 issued on May 4, 2021, and entitled "SYSTEMS AND METHODS FOR DETERMINING A TOOTH TRAJECTORY", a content of which is incorporated herein by reference in its entirety.

Further, in certain non-limiting embodiments of the present technology, the system 400 may be configured to produce at least one configuration of the aligner 10, configured to cause the at least some of the lower teeth 16 to move along the so determined tooth trajectories based on the planned orthodontic treatment.

To that end, the system 400 can further include a manufacturing system 440, to which the processor 550 can be configured to send respective instructions causing the manufacturing system 440 to produce the at least one configuration of the aligner 10. In some non-limiting embodiments of the present technology, the manufacturing system 440 can be a thermoforming system configured to produce the unfinished aligner 300, for example, using a thermopriming process, in which a preform aligner (not depicted) is shaped on the mold of the lower arch form 20.

In a specific non-limiting example, the thermoforming system can be of one of the types provided by HAMER LTD of Rambla Antoni Gaudi, 108792 La Granada (Barcelona) Spain. It should be expressly understood that the thermoforming system can be implemented in any other suitable equipment.

Further, after the thermoforming the unfinished aligner 300, the system 400 can be configured to trim excess material thereof, that is the excess portion 302, as described above, along the cutline 304 to produce the open edge 22 of the at least one configuration of the aligner 10.

To that end, in some non-limiting embodiments of the present technology, the system 400 can be configured to determine (or otherwise receive) data indicative of the cutline 304 304 and mark the cutline 304 on the unfinished aligner 300. To that end, the system 400 may further comprise a marking subsystem 450. It is not limited how the marking subsystem 450 may be implemented; however, in various non-limiting embodiments of the present technology, the marking subsystem 450 may include a marking head 452 for applying the cutline 304 onto the unfinished aligner 300 and a first robotic arm (not depicted) for holding and manipulating the unfinished aligner 300 around the marking head 452. In some non-limiting embodiments of the present technology, the marking head 452 may further comprise a coloring material storage (not depicted) for storing a coloring material (such as ink, as an example) and a supply control block (not depicted). In some non-limiting embodiments of the present technology, the marking head 452 may be implemented as a laser apparatus configurable to scorch the cutline 304 on the unfinished aligner 300.

In certain non-limiting embodiments of the present technology, the system 400 may further be configured to detect the cutline 304 applied on the unfinished aligner 300 and cut along the cutline 304 to produce the aligner 10. In this regard, the system 400 may further comprise a forming subsystem 460. In some non-limiting embodiments of the present technology, the forming subsystem 460 may include a second robotic arm (not depicted), at an end-effector of which there is installed a camera device 462 and the cutting device 464, enabling the camera device 462 and the cutting device 464 to move with six degrees of freedom. In some non-limiting embodiments of the present technology, the camera device 462 can be any appropriate digital camera configured to detect the cutline 304 applied by the marking subsystem 450 described above onto the unfinished aligner 300, including, for example, but not limited to, a coupled-charged device camera (a CCD camera).

As it can be appreciated from FIG. 7, in some non-limiting embodiments of the present technology, the cutting device 464 comprises the cutting head 704. Broadly speaking, the cutting head 704 is a component of the cutting device 464 that is configured to perform a cutting operation on a workpiece (such as the unfinished aligner 300). Thus, the implementation of the cutting head 704 generally depends on the implementation of the cutting device 464.

For example, in the embodiments where the cutting device 464 is a laser-based cutting device, the cutting head 704 comprises a scanner including one or more rotating mirrors and optical lenses configured to steer and focus a laser beam of predetermined power and wavelength along the cutline 304.

In another example, where the cutting device 464 comprises a mechanical cutting device, the cutting head 704 can comprise a rotary blade or linear razor, for example, configured to perform rotational or translational movements through the unfinished aligner 300. In yet other example, where the cutting device 464 comprises a water jet-based cutting device, the cutting head 704 can comprise a nozzle configured to direct a high-pressure water jet at a predetermined pressure through the unfinished aligner 300.

Further, according to certain non-limiting embodiments of the present technology, cutting parameters of the cutting head 704, such as a cutting power, a number of passes along the cutline 304, an exposure time of each point defining the cutline 304 to the cutting head 704, a speed of cutting, and the like, depend generally on properties and a thickness of the material of the unfinished aligner 300. These parameters are generally defined by a specific type and configuration of the cutting device 464, which can be predetermined for a given configuration of the unfinished aligner 300.

In those embodiments where the cutting device 464 is a laser-based cutting device, a specific non-limiting example thereof can comprise a laser-based cutting device of the Laser Aligner Cutter type provided by DENTAL ACCESS AG of Wiesenstrasse 36, 8952 Schlieren, Switzerland. It should be expressly understood that the laser-based cutting device can be implemented in any other suitable equipment.

In those embodiments where the cutting device 464 is a water jet-based cutting device, a specific non-limiting example thereof can comprise a water jet-based cutting device of one of the types provided by KMT WATERJET SYSTEMS INC of 635 West 12th Street Baxter Springs, KS 66713, USA. It should be expressly understood that the water jet-based cutting device can be implemented in any other suitable equipment.

In some non-limiting embodiments of the present technology, both the marking subsystem 450 and the forming subsystem 460 of the system 400 may be implemented as described in a co-owned U.S. patent application Ser. No. 16/704,718 filed on Dec. 5, 2019, entitled "SYSTEMS AND METHODS FOR FORMING PERSONALIZED ORTHODONTIC APPLIANCES", the content of which is hereby incorporated by reference in its entirety.

Thus, the forming subsystem 460 may be configured to: (1) cause the camera device 462 to move around the unfinished aligner 300 with the cutline 304 applied thereon to detect the cutline 304 and generating respective image data thereof; (2) receive the image data of the cutline 304; and (3)

based on the received image data of the cutline 304, cause cutting, by the cutting device 464 the unfinished aligner 300 along the cutline 304, thereby forming the aligner 10.

In other non-limiting embodiments of the present technology, the forming subsystem 460 may be configured for cutting the unfinished aligner 300 without requiring detection of the cutline 304. Instead, the determined cutline 304 is used to guide the cutting head 704 of the cutting device 464—for example, based on received data indicative of a position of the cutline 304 within the unfinished aligner 300. In some non-limiting embodiments of the present technology, the data indicative of the position of the cutline 304 within the unfinished aligner 300 may include at least one of: Cartesian coordinates; angular data indicative of a cutting angle for cutting the unfinished aligner 300; and a distance from the cutting device 464, as an example.

Further, with reference to FIG. 5, there is depicted a schematic diagram of a computing environment 540 suitable for use with some implementations of the present technology. The computing environment 540 comprises various hardware components including one or more single or multi-core processors collectively represented by the processor 550, a solid-state drive 560, a random-access memory 570 and an input/output interface 580. Communication between the various components of the computing environment 540 may be enabled by one or more internal and/or external buses 590 (for example, a PCI bus, universal serial bus, IEEE 1394 "Firewire" bus, SCSI bus, Serial-ATA bus, ARINC bus, etc.), to which the various hardware components are electronically coupled.

The input/output interface 580 allows enabling networking capabilities such as wire or wireless access. As an example, the input/output interface 580 comprises a networking interface such as, but not limited to, a network port, a network socket, a network interface controller, and the like. Multiple examples of how the networking interface may be implemented will become apparent to the person skilled in the art of the present technology. For example, but without being limiting, the input/output interface 580 may implement specific physical layer and data link layer standard such as Ethernet™, Fibre Channel, Wi-Fi™ or Token Ring™. The specific physical layer and the data link layer may provide a base for a full network protocol stack, allowing communication among small groups of computers on the same local area network (LAN) and large-scale network communications through routable protocols, such as IP.

According to implementations of the present technology, the solid-state drive 560 stores program instructions suitable for being loaded into the random-access memory 570 and executed by the processor 550, according to certain aspects and embodiments of the present technology. For example, the program instructions may be part of a library or an application.

In some non-limiting embodiments of the present technology, the computing environment 540 is implemented in a generic computer system, which is a conventional computer (that is, an "off the shelf" generic computer system). The generic computer system may be a desktop computer/personal computer but may also be any other type of electronic device such as, but not limited to, a laptop, a mobile device, a smart phone, a tablet device, or a server.

As persons skilled in the art of the present technology may appreciate, multiple variations as to how the computing environment 540 can be implemented may be envisioned without departing from the scope of the present technology.

Referring back to FIG. 4, the computer system 410 has at least one interface device 420 for providing an input or an output to a user of the system 400, the interface device 420 being in communication with the input/output interface 580. In the embodiment of FIG. 4, the interface device is a screen 422. In other non-limiting embodiments of the present technology, the interface device 420 may be a monitor, a speaker, a printer, or any other device for providing an output in any form such as an image form, a written form, a printed form, a verbal form, a 3D model form, or the like.

In the depicted embodiments of FIG. 4, the interface device 420 also comprises a keyboard 424 and a mouse 426 for receiving input from the user of the system 400. Other interface devices 420 for providing an input to the computer system 410 can include, without limitation, a USB port, a microphone, a camera, or the like.

The computer system 410 may be connected to other users, such as through their respective clinics, through a server (not depicted). The computer system 410 may also be connected to stock management or client software which could be updated with stock when the orthodontic treatment has been determined and/or schedule appointments or follow-ups with clients, for example.

Thus, given the architecture and examples provided above, it is now possible to execute a method of controlling the cutting head 704 of the cutting device 464 for cutting the unfinished aligner 300 for producing the open edge 22 of the aligner 10 used during a respective stage of the orthodontic treatment, as described above. With reference to FIG. 6, there is depicted a schematic diagram of a method 600, in accordance with certain non-limiting embodiments of the present technology. For example, the method 600 can be executed by the processor 550 of the system 400.

Method

Step 602: Acquiring a Mold 3D Digital Model Representative of a Surface of the Unfinished Orthodontic Appliance, the Mold 3D Digital Model Including an Indication of the Cutline Applied Thereon; the Cutline Having a Plurality of Points Defining a Path for the Cutting Head; Each Point of the Plurality of Points being Associated with a Respective Normal to the Surface of the Unfinished Orthodontic Appliance The method 600 commences at step 602 with the processor 550 being configured to obtain the image data associated with the subject. More specifically, according to certain non-limiting embodiments of the present technology, the processor 550 can be configured to receive a 3D digital model of the unfinished aligner 300 with the cutline 304 applied thereto.

With reference to FIG. 7, there is schematically depicted a perspective view of a mold 3D digital model 700 representing the surface of the unfinished aligner 300, which can be used, by the processor 550 for determining the open edge 22 of the aligner 10 that is to be applied to the lower arch form 20 of the subject during orthodontic treatment, in accordance with certain non-limiting embodiments of the present technology.

As noted above, according to the non-limiting embodiments of the present technology, the processor 550 could be configured to cause manufacture of the unfinished aligner 300 using the manufacturing system 440. More specifically, in those embodiments where the manufacturing system 440 comprises a thermoforming system, the processor 550 can be configured to cause the manufacturing system 440 to thermoform the unfinished aligner 300 on the respective mold from a preform made of a thermoplastic material. The respective mold could be representative of a desired position of at least one of the lower teeth 16 of the subject. For example, the desired position of the at least one tooth of the lower teeth 16 can be a respective target position for a given stage of the orthodontic treatment, corresponding to alignment of the lower teeth 16 within the lower arch from 20.

Further, according to certain non-limiting embodiments of the present technology, the processor 550 can be configured to cause the imaging device 430 to: (i) capture and process the image data of the unfinished aligner 300, thereby generating the mold 3D digital model 700; (ii) retrieve data of or determine the cutline 304 for the unfinished aligner 300 using one of the approaches mentioned above; and (iii) apply the cutline 304 to the unfinished aligner 300 in the mold 3D digital model 700. However, in other non-limiting embodiments of the present technology, the cutline 304 could be preliminarily visually applied (such as inked or printed) to the unfinished aligner 300 prior to the processor 550 generating the mold 3D digital model 700. This may allow the imaging device 430 to capture the image data of the cutline 304 along with the image data of the unfinished aligner 300 hence generating the mold 3D digital model 700 with the cutline 304 already present thereon.

In some non-limiting embodiments of the present technology, the processor 550 can be configured to receive, from the imaging device 430, the mold 3D digital model 700 comprising a plurality of mesh elements (not depicted) representative of a surface of the unfinished aligner 300. For example, the imaging device 430 can be configured to generate the plurality of mesh elements including, without limitation, triangular mesh elements, quadrilateral mesh elements, convex polygonal mesh elements, or even concave polygonal mesh elements, as an example, without departing from the scope of the present technology. However, in those embodiments where the imaging device 430 is the 3D laser scanner, the mold 3D digital model 700 comprises a 3D point cloud representative of the surface of the unfinished aligner.

With reference to FIG. 8, there is schematically depicted a magnified perspective view of the mold 3D digital model 700 of the unfinished aligner 300 with the cutline 304 applied thereon, in accordance with certain non-limiting embodiments of the present technology.

According to certain non-limiting embodiments of the present technology, the cutline 304 within the mold 3D digital model 700 can comprise a plurality of points (vertices) 802, to which the cutting head 704 of the cutting device 464 is to be applied for cutting the unfinished aligner 300.

According to certain non-limiting embodiments of the present technology, the processor 550 can be configured to define the plurality of points 802 along the cutline 304 to correspond to respective vertices formed by mesh elements along which the cutline 304 extends. In other non-limiting embodiments of the present technology, the processor 550 can be configured to define the plurality of points 802 having a predetermined number of points uniformly distributed along the cutline 304. The predetermined number of points in the plurality of points 802 can depend, inter alia, on a trade-off between an accuracy of defining the cutline 304 and/or cutting accuracy therealong and available computational resources of the computer system 410.

Further, according to certain non-limiting embodiments of the present technology, the processor 550 can be configured to obtain, for each point of the plurality of points 802, such as a given point 804, a respective normal 806 to the surface of the unfinished aligner 300 at the given point 804. For example, in some non-limiting embodiments of the present technology, the processor 550 can be configured to determine the respective normal 806 as a weighted average of normals of respective mesh elements adjacent to the given point 804. In various non-limiting embodiments of the present technology, weights can be based on either internal angles at the given point 804 within each face (angle-weighted) or an area of each adjacent mesh element (area-weighted).

With back reference to FIG. 7, according to certain non-limiting embodiments of the present technology, along with the mold 3D digital model 700, the processor 550 can be configured to generate a device 3D digital model 702, representative of a surface of the cutting device 464. Similar to the mold 3D digital mode 700, the processor 550 can be configured to generate the device 3D digital model 702 that comprises a plurality of mesh elements defining the surface of the cutting device 464.

In some non-limiting embodiments of the present technology, the device 3D digital model 702 can be associated with a reference axis 708. The reference axis 708 can be, for example, a central longitudinal axis of symmetry which extends through a center of the cutting head 704. As will become apparent from description provided hereinbelow, the processor 550 can be configured to use the reference axis associated with the cutting device 464 to determine positions of the cutting head 704 relative to the unfinished aligner 300 using the respective 3D digital models.

Further, in some non-limiting embodiments of the present technology, in a similar fashion, the processor 550 can be configured to acquire a table 3D digital model 706 of a worktable of the cutting device 464 on which the unfinished aligner 300 is to be disposed and secured in place during the cutting operation.

It should be expressly understood that in various non-limiting embodiments of the present technology the cutting device 464 can include other components that are omitted in the present drawings for clarity and simplicity of explanation of the present technology. The presence of these components will generally depend on a specific type and configuration of the cutting device 464 and can include, for example, walls of a cutting chamber, mounting elements, electronic components, and internal wiring disposed within the cutting device 464, and the like. Thus, in some non-limiting embodiments of the present technology, for a more realistic modelling of positions and movements of the cutting head 704 along the cutline 304, the processor 550 can be configured to generate respective 3D digital models of these components of the cutting device 464 in a similar manner.

The method 600 hence advances to step 604.

Step 604: Defining, for a Given Point of the Plurality of Points of the Cutline, a Plurality of Directions for Applying the Cutting Head to the Given Point With continued reference to FIG. 8, at step 604, according to certain non-limiting embodiments of the present technology, the processor 550 can be configured to define, at the given point 804, a plurality of directions 808 (depicted in broken line in FIG. 8) for applying the cutting head 704 to the given point 804 of the cutline 304.

According to certain non-limiting embodiments of the present technology, the processor 550 can be configured to define the plurality of directions 808 at the given point 804 within a given spatial angle 810. In the context of the present specification, the term "spatial angle," such as the given spatial angle 810, refers to a solid angle subtended at the given point 804 by a surface, representing the extent of that surface as viewed from the given point 804. In some non-limiting embodiments of the present technology, the given spatial angle 810 can be predetermined and comprise $\pi$, $\pi/2$, $\pi/3$, $\pi/4$, $\pi/6$, or $\pi/12$ steradians.

Further, in some non-limiting embodiments of the present technology, the processor 550 can be configured to define the plurality of directions 808 within 271 steradians around the given point 804 by randomly sampling them within an imaginary sphere with its center being at the given point 804 in accordance with a predetermined distribution, such as a normal distribution with a given set of parameters. In other non-limiting embodiments of the present technology, the processor 550 can be configured to define the plurality of directions 808 similarly but within the given spatial angle 810. In yet other non-limiting embodiments of the present technology, the processor 550 can be configured to uniformly define the plurality of directions 808 at the given point 804 within the given spatial angle 810. In some non-limiting embodiments of the present technology, the processor 550 can be configured to generate the plurality of directions 808 having a random number of directions. In other non-limiting embodiments of the present technology, the processor 550 can be configured to generate the plurality of directions 808 having a predetermined number of directions, such as 10, 50, 500, and the like.

The method 600 hence advances to step 606.

Step 606: Determining, for Each Direction of the Plurality of Directions of the Cutting Head at the Given Point, a Respective Loss Value Representative of a Deviation Value of an Associated Direction from the Respective Normal at the Given Point At step 606, according to certain non-limiting embodiments of the present technology, the processor 550 can be configured to determine for each point of the plurality of points 802 defining the cutline 304 a plurality of loss values. More specifically, in some non-limiting embodiments of the present technology, a first loss value of the plurality of loss values that the processor 550 can be configured to determine is representative of an aggregate deviation value between each direction of the plurality of directions 808 from the respective normal 806 defined at the given point 804. As it can be appreciated, like the given spatial angle 810, the first loss value can be expressed in steradians.

For example, the processor 550 can be configured to determine for a given direction 812 of the plurality of directions 808 a respective deviation value 814 from the respective normal 806. Further, by aggregating respective deviation values for each one of the plurality of directions 808, the processor 550 is configured to determine a first respective loss value for the given point 804. In various non-limiting embodiments of the present technology, to aggregate the respective deviation values, the processor 550 can be configured to perform at least one of a summation, a multiplication, a mean sum of squares, for example, of the respective deviation values.

Further, in some non-limiting embodiments of the present technology, to determine other loss values of the plurality of loss values associated with the given point 804, the processor 550 can be configured to determine transitions of the cutting head 704 between each one of the plurality of directions 808 at the given point 804 and (1) each one of a first plurality of directions (not depicted) defined at a first point 816 of the plurality of points 802, sequentially following the given point 804; and (2) each one of a second plurality of directions (not depicted) defined at a second point 818 of the plurality of points 802, sequentially preceding the given point 804. Needless to say, the processor 550 could be configured to define the first and second plurality of directions at the first and second point 816, 818, respectively, in a similar fashion to that described at step 604 with respect to the given point 804.

Thus, in some non-limiting embodiments of the present technology, a respective second loss value of the plurality of loss values associated with the given point 804 is representative of an aggregate path length along each transition of the cutting head 704 from each direction of the plurality of directions 808 at the given point 804 to each direction of the first plurality of direction at the first point 816. For example, the processor 550 can be configured to determine respective path lengths of the cutting head 704 from the given direction 812 at the given point 804 and each direction of the first plurality of directions at the first point 816. Further, similar to aggregating the respective deviation values, the processor 550 can be configured to aggregate the respective path lengths of the cutting head 704 from each direction of the plurality of directions 808 to each direction of the first plurality of directions, thereby generating the respective second loss value associated with the given point 804.

Further, according to certain non-limiting embodiments of the present technology, a respective third loss value of the plurality of loss values associated with the given point 804 is representative of an aggregate difference values between (1) each path length of the cutting head 704 along respective transitions from the second point 818 to the given point 804; and (2) each path length of the cutting head 704 along respective transitions from the given point 804 to the first point 816. For example, the processor 550 can be configured to determine a given difference value between (1) a given transition of the cutting head 704 from the respective direction defined at the second point 818 to the given direction 812 defined at the given point 804; and (2) another transition from the given direction 812 defined at the given point 804 to the respective direction defined at the first point 816. Further, akin to aggregating the respective deviation values and path lengths, as described above, the processor 550 can be configured to aggregate the so determined difference values between path lengths from the second point 818 to the given point 804 and from the given point 804 to the first point 816, thereby generating the respective third loss value associated with the given point 804.

In some non-limiting embodiments of the present technology, prior to determining at least one of the respective first, second, and third loss value associated with the given point 804, the processor 550 can be configured to apply certain constraints to at least one of (1) the respective plurality of directions defined at each point of the cutline 304 and (2) respective transitions between sequentially following points. By doing so, the processor 550 can be configured to determine admissible directions at each point of the cutline 304 and admissible transitions for the cutting head 704. Further, based on these admissible directions and transitions of the cutting head 704, the processor 550 can be configured to determine the respective first, second, and third loss values for each of the plurality of points 802 as described above.

For example, in some non-limiting embodiments of the present technology, the processor 550 can be configured to apply, to the respective plurality of directions defined at each point of the plurality of points 802 defining the cutline 304, a collision constraint. To do so, according to certain non-limiting embodiments of the present technology, the processor 550 can be configured to (i) model respective positions of the cutting head 704 at each one of the plurality of directions 808 at the given point 804 of the cutline 304 and (ii) filter out those directions at which, during the cutting operation, portions of the cutting device 464 would collide with portions of the unfinished aligner 300 or other portions of the cutting device 464. To model the positions of the cutting head 704 at each of the directions defined at the points of the cutline 304, the processor 550 can be configured to use at least one of (1) the mold 3D digital model 700 of the unfinished aligner 300; (2) the device 3D digital model 702 of the cutting device 464; and (3) the table 3D digital model 706 of the worktable for positioning the unfinished aligner 300 during the cutting, for example. Additionally, for a more realistic modelling of movements of the cutting head 704 along the cutline 304, the processor 550 can be configured to use 3D digital models of other components of the cutting device 464 mentioned above.

More specifically, as schematically depicted in FIG. 9A, in accordance with certain non-limiting embodiments of the present technology, through such modelling, the processor 550 can be configured to (i) determine that positioning the cutting head 704 at one of the directions along the cutline 304 defined above would cause a first collision 902 between the cutting device 464 and the worktable, represented by the table 3D digital model 706; and (ii) remove this direction from further consideration. In another example, as schematically depicted in FIG. 9B, in accordance with certain non-limiting embodiments of the present technology, the processor 550 can be configured to determine that positioning the cutting head 704 at another direction along the cutline 304 would cause a second collision 904 between the cutting device 464 and at least one portion of the unfinished aligner 300 that is not intended to be cut. Consequently, the processor 550 can be configured to filter out the direction causing the second collision 904.

Further, in some non-limiting embodiments of the present technology, the processor 550 can be configured to apply a reachability constraint to the directions defined for positioning the cutting head 704 along the cutline 304. To do so, using the 3D digital models of the unfinished aligner 300 and the cutting device 464, the processor 550 can be configured to: (i) model the respective positions of the cutting head 704 at each direction defined at each point of the plurality of points 802 defining the cutline 304; (ii) identify directions, at which the cutting head 704 is not capable of touching a respective intended point of the plurality of points 802; and (iii) remove these directions from further consideration in determining the respective loss values. For example, but without limitation, the cutting head 704 may not reach the given point 804 of the cutline 304 at the given direction 812 due to certain kinematic limitations imposed on the movement of the cutting head 704 around the unfinished aligner 300 when it is positioned on the worktable. In another example, the cutting head 704 may be incapable of reaching the given point 804 of the cutline 304 at the given direction 812 because at the given direction 812 another component of the cutting device 464 or the unfinished aligner may obstruct a path of the cutting head 704.

In some non-limiting embodiments of the present technology, alternative or additional to the collision and reachability constraints mentioned above, the processor 550 may further be configured to apply constraint to movement parameters of the cutting head 704 along the cutline 304. For example, in some non-limiting embodiments of the present technology, the processor 550 can be configured to apply a speed constraint to transitions of the cutting head 704 along the cutline 304. To do so, according to certain non-limiting embodiments of the present technology, the processor 550 can be configured to: (i) model transitions of the cutting head 704 between directions defined at sequentially adjacent points of the plurality of points 802 defining the cutline 304;

(ii) determine, for each transition, a respective speed value; (iii) identify transitions associated with respective speed values outside a predetermined speed range; and (iv) remove the so identified transitions from further use in determining the respective loss value for the points of the cutline 304. For example, depending on a particular embodiment of the present technology, the predetermined speed range may include speed values from about 500 mm/min to about 2000 mm/min.

In another example, the processor 550 can be configured to apply an acceleration constrain to the transitions of the cutting head 704 between sequentially following points of the cutline 304. More specifically, to do so, the processor 550 can be configured to: (i) model transitions of the cutting head 704 between directions defined at sequentially adjacent points of the plurality of points 802 defining the cutline 304; (ii) determine, for each transition, a respective acceleration value; (iii) identify transitions associated with respective acceleration values outside a predetermined acceleration range; and (iv) remove the so identified transitions from further use in determining the respective loss value for the points of the cutline 304. For example, depending on a particular embodiment of the present technology, the predetermined acceleration range may include acceleration values between about 1000 mm/s² and about 3000 mm/s².

Thus, as mentioned above, by applying the above mentioned constraints to the directions of application of the cutting head 704 along the cutline 304 and/or transitions of the cutting head 704 between sequentially following points of the cutline 304, the processor 550 may further be configured to identify admissible directions at each point of the plurality of points 802 and admissible transitions for the cutting head between sequentially following points of the plurality of points 802. Further, in these embodiments, the processor 550 can be configured to determine the respective first, second, and third loss values for each point of the plurality of points 802 defining the cutline 304, as described in detail above.

The method 600 hence advances to step 608.

Step 608: Aggregating, for Each Direction of the Cutting Head at Each Point of the Plurality of Points of the Cutline, Respective Loss Values, Thereby Determining a Total Loss Value At step 608, after determining the respective first, second, and third loss values for each of the point of the cutline 304, according to certain non-limiting embodiments of the present technology, the processor 550 can be configured to determine a total loss value for the cutline 304.

To that end, the processor 550 can be configured to aggregate at least one of the first, second, and third loss values associated with each one of the plurality of points 802. More specifically, in some non-limiting embodiments of the present technology, to determine the total loss value associated with the cutline 304, the processor 550 can be configured to aggregate only a given one of the respective first, second, and third loss values associated with the points. For example, the processor 550 can be configured to aggregate only the respective first loss values determined for each one of the plurality of points 802, representative of deviation values of respective directions defined at each point from the associated normals. However, in other non-limiting embodiments of the present technology, the processor 550 can be configured to aggregate each one of the respective first, second, and third loss values associated with the plurality of points 802 defining the cutline 304 for generating the total loss values associated therewith.

It is not limited how the processor 550 can be configured to aggregate the at least one of the respective first, second, and third loss values to generate the total loss value. In various non-limiting embodiments of the present technology, the processor 550 can be configured to apply to each one of the respective first, second, and third loss values at least one of summation, multiplication, or a mean sum of squares, for example. Further, the processor 550 can apply a similar operation to the aggregated first, second, and third loss values. Use of other mathematic operations for generating the total loss value is also envisioned and within the scope of the present technology.

The method 600 hence advances to step 610.

Step 610: Identifying a Selected Direction of the Plurality of Directions for the Cutting Head at the Given Point that Minimizes the Total Loss Value At step 610, according to certain non-limiting embodiments of the present technology, the processor 550 can be configured to identify directions and transitions for the cutting head 704 that would minimize the total loss values associated with the cutline 304 determined at step 608.

To that end, in some non-limiting embodiments of the present technology, the processor 550 can be configured to generate a graph representative of all possible directions and transitions for the cutting head 704 along the cutline 304 that have been identified through the execution of the previous steps. With reference to FIG. 10, there is depicted a schematic diagram of a trajectory layered graph 1000 for the cutting head 704, in accordance with certain non-limiting embodiments of the present technology.

As best seen from FIG. 10, the trajectory layered graph 1000 comprises a plurality of layers 1002, each of which is representative of the respective point of the plurality of points 802 of the cutline 304. For example, a given layer 1004 is representative of the given point 804; the first layer 1006, sequentially following the given layer 1004, is representative of the first point 816, sequentially following the given point 804 along the cutline 304; and the second layer 1008, sequentially preceding the given layer 1004, is representative of the second point 818, sequentially preceding the given point 804 along the cutline 304.

Further, each layer of the plurality of layers 1002, such as the given layer 1004, includes a plurality of nodes (not separately numbered). Each node of the plurality of nodes of the given layer 1004 is representative of a respective direction of the plurality of directions 808 defined at the given point 804 as mentioned above at step 604. For example, in the given layer 1004, a given node 1012 is representative of the given direction 812.

Accordingly, edges of the trajectory layered graph 1000 extending between the plurality of layers 1002 thereof are representative of transitions of the cutting head 704 between directions defined at each pair of sequentially following points of the plurality of points 802 defining the cutline 304. For example, a first edge 1011 is representative of a first transition between the given direction 812 and one of the first plurality of directions defined at the first point 816. Similarly, a second edge 1013 is representative of a second transition from one of the second plurality of directions defined at the second point 818 to the given direction 812 defined at the given point 804.

As it can be appreciated, in those embodiments where, prior to determining the total loss value associated with the cutline 304, the processor 550 is configured to apply the plurality of constraints to the directions and transitions of the cutting head 704, as mentioned above, thereby identifying admissible directions for application of the cutting head 704 and admissible transitions thereof, the trajectory layered graph 1000 will be representative of only admissible directions remaining at each of the plurality of points 802 and admissible transitions therebetween.

Further, after generating the trajectory layered graph 1000, according to certain non-limiting embodiments of the present technology, the processor 550 can be configured to determine: (1) directions of applying the cutting head 704 to each one of the plurality of points 802 and (2) transitions for the cutting head 704 between sequentially following points of the plurality of points 802 that would minimize the total loss values associated with the cutline 304.

To do so, according to certain non-limiting embodiments of the present technology, the processor 550 can be configured to traverse the trajectory layered graph 1000 from an initial node 1001 to a terminal node 1003 identifying: (1) nodes that are associated with a smallest deviation value of the associated direction from the respective normal associated with the respective layer; and (2) edges that are associated with a smallest transition path and/or a smallest difference from a sequentially preceding transition. It is not limited how the processor 550 can be configured to traverse the trajectory layered graph 100. For example, the processor 550 can be configured to use a graph traversal algorithm, which, in various non-limiting embodiments of the present technology, can comprise at least one of: a Breadth-First Search (BFS) graph traversal algorithm, a Depth-First Search (DFS) graph traversal algorithm, a Dijkstra's graph traversal algorithm, a Bellman-Ford graph traversal algorithm, and others.

By doing so, the processor 550 can be configured to determine a cutting trajectory 1015 (bolded in FIG. 10) for the cutting head 704, which comprises selected directions and selected transitions for the cutting head 704 that minimize the total loss values. For example, in the example of FIG. 10, the selected directions of applying the cutting head 704 to the points of the cutline 304 comprise the given direction 812 at the given point 804, a first selected direction 1016 at the first point 816, and a second selected direction 1018 at the second point 818. Accordingly, the selected transitions include the second transition from the second point 818 to the given point 804, represented by the second edge 1013, and the first transition from the given point 804 to the first point 818, represented by the first edge 1011.

In some non-limiting embodiments of the present technology, after determining the selected directions and transitions for the cutting head 704, the processor 550 can be configured to: (i) decrease the given spatial angle 810 by a predetermined value for defining the plurality of directions 808 at the given point 804, as described at step 604, and (ii) re-execute the steps 606, 608, and 610. In some non-limiting embodiments of the present technology, the processor 550 can be configured to iteratively decrease the given spatial angle 810 until a predetermined spatial angle, such as $\pi/24$ or $\pi/36$. The predetermined value for decreasing the given spatial angle 810 can be, for example, $\pi/24$, $\pi/36$, or $\pi/96$, as an example. By doing so, at each iteration, the processor 550 can be configured to decrease the range for the plurality of directions 808 and spend less time and computational resources for traversing the trajectory layered graph 1000 for identifying the selected directions and transitions for the cutting head 704.

Thus, the processor 550 can be configured to identify the selected directions in the mold 3D digital model 700, as schematically depicted in FIG. 11, in accordance with certain non-limiting embodiments of the present technology.

The method 600 hence advances to step 612.

Step 612: Determining, for Each Selected Direction of the Cutting Head at a Respective Point of the Cutline, a Respective Position for the Cutting Head Along the Cutline At step 612, according to certain non-limiting embodiments of the present technology, the processor 550 can be configured to determine positions of the cutting head 704 corresponding to the selected directions at each one of the plurality of points 802 defining the cutline 304.

With continued reference to FIG. 11 and with back reference to FIG. 7, according to certain non-limiting embodiments of the present technology, the processor 550 can be configured to determine positions for the cutting head 704 by aligning the reference axis 708 thereof with the respective selected directions determined for each one of the plurality of points 802 at step 610. To do so, the processor 550 can be configured to: (i) define a coordinate system 1102 (such as a Cartesian coordinate system) around the mold 3D digital model 700 with the identified selected directions for the cutting head 704; and (ii) determine coordinates within the coordinate system 1102 for a tip of the cutting head 704 when the reference axis 708 thereof aligns with each of the selected directions at each point of the plurality of points 802 defining the cutline 304.

Further, in some non-limiting embodiments of the present technology, based on the selected transitions for the cutting head 704 between the points of the cutline 304, the processor 550 can be configured to determine time and speed for every selected transition. Further, based on the determined time and speed for the selected transitions of the cutting head, the processor 550 can be configured to determine parameters of the cutting for each specific type of the cutting device 464 described above. For example, in those embodiments where the cutting device 464 is a laser-based cutting device, the processor 550 can be configured to determine, based on the time and speed for each selected transition, at least one of: a respective laser emission power value and a respective exposure time of the unfinished aligner 300 at each point of the cutline 304. In other embodiments where the cutting device 464 is a water jet-based cutting device, the processor 550 can be configured to determine, based on the respective time and speed values for each selected transition, at least one of a respective water jet power value and a respective exposure time at each point of the cutline 304.

The method 600 hence advances to step 614.

Step 614: Storing Coordinates of the Respective Position of the Cutting Head in Association with Coordinates of the Given Point for Further Use in Controlling the Cutting Head of the Cutting Device for Producing the Orthodontic Appliance At step 614, according to certain non-limiting embodiments of the present technology, the processor 550 can be configured to store, for example, in the solid-state drive 560 of the computer system 410, at least one of: (1) coordinates of respective positions of the cutting head 704 in the coordinate system 1102; (2) respective power values for a specific type of the cutting device 464; and (3) respective exposure times of the unfinished aligner 300 to the cutting head 704 at each one of the plurality of points 802.

Further, the processor 550 can be configured to use the stored values for causing the execution of the cutting operation. More specifically, based on pre-stored executable instructions, the processor 550 can be configured to: (i) retrieve these values from the solid-state drive 560; (ii) feed these values to the cutting device 464; and (iii) generate and transmit control electrical signals to the cutting device 464, thereby causing the cutting device 464 to position the cutting head 704 along the cutline 304 in accordance with the respective selected directions and cut the unfinished aligner 300 with the determined cutting parameters. More specifically, the processor 550 can be configured to cause the cutting device 464 to: (i) position the cutting head 704 at the given point 804 at the given direction 812 which has been determined as selected at step 610; and (ii) cut the unfinished aligner 300 with the respective cutting power value during the respective exposure time determined at step 612. By doing so, the processor 550 can be configured to cause the cutting device 464 to cut the unfinished aligner 300 along the cutline 304 to remove the excess portion 302 thereof, thereby producing the aligner 10. The aligner 10 can be used during orthodontic treatment of the tooth misalignment as described above.

The method 600 hence terminates.

Thus, certain embodiments of the method 600 may allow determining the selected directions and transitions for the cutting head 704 of the cutting device 464 along the cutline 304, which may be associated with more accurate, less energy-consuming, and more efficient cutting through the unfinished aligner 300.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for controlling a cutting head of a cutting device for cutting an unfinished orthodontic appliance along a cutline for producing an orthodontic appliance, the method comprising:

acquiring a mold 3D digital model representative of a surface of the unfinished orthodontic appliance,
the mold 3D digital model including an indication of the cutline applied thereon;
the cutline having a plurality of points defining a path for the cutting head;
each point of the plurality of points being associated with a respective normal to the surface of the unfinished orthodontic appliance;
defining, for a given point of the plurality of points of the cutline, a plurality of directions for applying the cutting head to the given point;
determining, for a given direction of the plurality of directions of the cutting head at the given point, a respective loss value representative of an angular deviation value of an associated direction from the respective normal at the given point;
determining, for the given point, respective second loss values,
a given one of the respective second loss values being representative of a path length of the cutting head from the given direction at the given point to a respective direction at a sequentially following point of the cutline;
aggregating, for each point of the plurality of points of the cutline, (i) the respective loss value and (ii) the respective second loss values, thereby determining a total loss value associated with the cutline;
identifying, for each point of the cutline, (i) a selected direction of the plurality of directions for the cutting head at the given point and (ii) a selected transition from the given point to the sequentially following point of the cutline that minimize the total loss value;
determining, based on the selected direction associated with the given point of the cutline, a respective position for the cutting head at the given point along the cutline; and
storing coordinates of the respective position of the cutting head and the selected transition in association with coordinates of the given point for further use in controlling the cutting head of the cutting device for producing the orthodontic appliance.

2. The method of claim 1, wherein the defining the plurality of directions for the cutting head at the given point comprises defining a predetermined number of directions.

3. The method of claim 1, wherein the defining the plurality of directions for the cutting head at the given point comprises defining the plurality of directions at random.

4. The method of claim 1, wherein:
the defining the plurality of directions for the cutting head at the given point comprises defining the plurality of directions within a given angular range relative to the respective normal at the given point; and
prior to the storing, the method further comprises iteratively executing:
decreasing the given angular range for the plurality of directions; and
executing the steps of (i) the defining the plurality of directions; (ii) the determining the respective loss value; (iii) the determining the respective position; (iv) the determining the total loss value; and (v) the minimizing the total loss value, until the given angular range reaches a predetermined angular threshold.

5. The method of claim 1, wherein, prior to the determining the respective loss value:
the method further comprises determining, for each direction of the plurality of directions, a plurality of constraints, thereby determining a plurality of admissible directions; and
the determining the respective loss value comprises determining the respective loss value for each admissible direction of the plurality of admissible directions.

6. The method of claim 5, wherein:
the method further comprises acquiring a device 3D digital model representative of a surface of the cutting device; and
the plurality of constraints includes at least one selected from the group consisting of:
a reachability constraint for filtering out those of the plurality of directions at the given point, along which positioning the cutting head is infeasible;
an acceleration constraint for filtering out, using the mold 3D digital model, those of the plurality of directions at the given point, from which the cutting head will move to respective positions thereof at a sequentially following point of the cutline with an acceleration value outside a predetermined range of acceleration values;
a speed constraint for filtering out, using the mold 3D digital model, those of the plurality of directions at the given point, from which the cutting head will move to the respective positions thereof at the sequentially following point of the cutline with a speed value outside a predetermined range of speed values; and
a collision constraint for filtering out, using the mold and device 3D digital models, those of the plurality of directions at the given point, at which the cutting head, when positioned at the given point of the cutline, will collide with at least one of: (i) other portions of the cutting device; and (ii) other portions of the unfinished orthodontic appliance aside from the given point.

7. The method of claim 1, wherein, prior to the determining the total loss value:

the method further comprises:

determining, for the given direction of the plurality of directions associated with the given point, a plurality of transitions therefrom to each direction associated with a sequentially following point of the cutline;

determining, for a given transition of the plurality of transitions:

a respective third loss value representative of a difference between path lengths along the given transition and along a given preceding transition, from a sequentially preceding point to the given point of the cutline; and the determining the total loss value comprises aggregating, for each direction of the cutting head at each point of the plurality of points of the cutline: (i) the respective loss values; (ii) respective second loss values; and (iii) respective third loss values.

8. The method of claim 1, wherein the minimizing the total loss value comprises applying a Dynamic Programming algorithm.

9. The method of claim 1, wherein:

the cutting device is a laser cutting device; and the controlling the cutting head comprises:

determining, based on the coordinates of respective position of the cutting head associated with the given point, at least one of a (i) a time and (ii) a speed for performing a given transition from the given point to a sequentially following point of the cutline;

based on the at least one of the time and the speed, determining an exposure time for the unfinished orthodontic appliance at the given point of the cutline to laser radiation from the laser cutting device; and feeding, to the laser cutting device: (i) the coordinates of respective positions of the cutting head along the cutline; and (ii) exposure times associated with each point of the cutline, to cause the cutting head to cut the unfinished orthodontic appliance along the cutline.

10. A system for controlling a cutting head of a cutting device for cutting an unfinished orthodontic appliance along a cutline for producing an orthodontic appliance, the system comprising at least one processor, a non-transitory computer-readable memory storing executable instructions, which, when executed by the at least one processor, cause the system to:

acquire a mold 3D digital model representative of a surface of the unfinished orthodontic appliance, the mold 3D digital model including an indication of the cutline applied thereon;

the cutline having a plurality of points defining a path for the cutting head;

each point of the plurality of points being associated with a respective normal to the surface of the unfinished orthodontic appliance;

define, for a given point of the plurality of points of the cutline, a plurality of directions for applying the cutting head to the given point;

determine, for a given direction of the plurality of directions of the cutting head at the given point, a respective loss value representative of an angular deviation value of an associated direction from the respective normal at the given point;

determine, for the given point, respective second loss values, a given one of the respective second loss values being representative of a path length of the cutting head from the given direction at the given point to a respective direction at a sequentially following point of the cutline:

aggregate, for each point of the plurality of points of the cutline, (i) the respective loss value and (ii) the respective second loss values, thereby determining a total loss value associated with the cutline;

identify, for each point of the cutline, (i) a selected direction of the plurality of directions for the cutting head at the given point and (ii) a selected transition from the given point to the sequentially following point of the cutline that minimize the total loss value;

determine, based on the selected direction associated with the given point of the cutline, a respective position for the cutting head at the given point along the cutline; and store coordinates of the respective position of the cutting head and the selected transition in association with coordinates of the given point for further use in controlling the cutting head of the cutting device for producing the orthodontic appliance.

11. The system of claim 10, wherein to define the plurality of directions for the cutting head at the given point, the executable instructions cause the system to define a predetermined number of directions.

12. The system of claim 10, wherein to define the plurality of directions for the cutting head at the given point, the executable instructions cause the system to define the plurality of directions at random.

13. The system of claim 10, wherein:

to define the plurality of directions for the cutting head at the given point, the executable instructions cause the system to define the plurality of directions within a given angular range relative to the respective normal at the given point; and prior to storing, the executable instructions further cause the system to iteratively execute:

decreasing the given angular range for the plurality of directions; and (i) defining the plurality of directions; (ii) determining the respective loss value; (iii) determining the respective position; (iv) determining the total loss value; and (v) minimizing the total loss value, until the given angular range reaches a predetermined angular threshold.

14. The system of claim 10, wherein, prior to determining the respective loss value: the executable instructions cause the system to determine, for each direction of the plurality of directions, a plurality of constraints, thereby determining a plurality of admissible directions; and to determine the respective loss value, the executable instructions cause the system to determine the respective loss value for each admissible direction of the plurality of admissible directions.

15. The system of claim 14, wherein:

the executable instructions further cause the system to acquire a device 3D digital model representative of a surface of the cutting device; and the plurality of constraints includes at least one selected from the group consisting of:

a reachability constraint for filtering out those of the plurality of directions at the given point, along which positioning the cutting head is infeasible;

an acceleration constraint for filtering out, using the mold 3D digital model, those of the plurality of directions at the given point, from which the cutting head will move to respective positions thereof at a sequentially following point of the cutline with an acceleration value outside a predetermined range of acceleration values;

a speed constraint for filtering out, using the mold 3D digital model, those of the plurality of directions at the given point, from which the cutting head will move to the respective positions thereof at the sequentially following point of the cutline with a speed value outside a predetermined range of speed values; and a collision constraint for filtering out, using the mold and device 3D digital models, those of the plurality of directions at the given point, at which the cutting head, when positioned at the given point of the cutline, will collide with at least one of: (i) other portions of the cutting device; and (ii) other portions of the unfinished orthodontic appliance aside from the given point.

16. The system of claim 10, wherein, prior to determining the total loss value:

the executable instructions cause the system to:

determine, for the given direction of the plurality of directions associated with the given point, a plurality of transitions therefrom to each direction associated with a sequentially following point of the cutline;

determine, for a given transition of the plurality of transitions:

a respective third loss value representative of a difference between path lengths along the given transition and along a given preceding transition, from a sequentially preceding point to the given point of the cutline; and to determine the total loss value, the executable instructions cause the system to aggregate, for each direction of the cutting head at each point of the plurality of points of the cutline: (i) the respective loss values; (ii) respective second loss values; and (iii) respective third loss values.

17. The system of claim 10, wherein to minimize the total loss value comprises, the executable instructions cause the system to apply a Dynamic Programming algorithm.

18. The system of claim 10, wherein:

the cutting device is a laser cutting device; and the controlling the cutting head comprises:

determining, based on the coordinates of respective position of the cutting head associated with the given point, at least one of a (i) a time and (ii) a speed for performing a given transition from the given point to a sequentially following point of the cutline;

based on the at least one of the time and the speed, determining an exposure time for the unfinished orthodontic appliance at the given point of the cutline to laser radiation from the laser cutting device; and feeding, to the laser cutting device: (i) the coordinates of respective positions of the cutting head along the cutline; and (ii) exposure times associated with each point of the cutline, to cause the cutting head to cut the unfinished orthodontic appliance along the cutline.

* * * * *